(12) United States Patent
Ji et al.

(10) Patent No.: US 12,131,861 B2
(45) Date of Patent: Oct. 29, 2024

(54) POWER MODULE, POWER SUPPLY SYSTEM AND MULTI-PHASE INVERSE-COUPLED INDUCTOR

(71) Applicant: Delta Electronics (Shanghai) CO., LTD, Shanghai (CN)

(72) Inventors: Pengkai Ji, Shanghai (CN); Yibing Cheng, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 809 days.

(21) Appl. No.: 17/225,068

(22) Filed: Apr. 7, 2021

(65) Prior Publication Data

US 2021/0350977 A1    Nov. 11, 2021

(30) Foreign Application Priority Data

May 9, 2020    (CN) .......................... 202010387760.8

(51) Int. Cl.
*H01F 27/29* (2006.01)
*H01F 27/26* (2006.01)
*H02M 7/00* (2006.01)

(52) U.S. Cl.
CPC ............. *H01F 27/29* (2013.01); *H01F 27/26* (2013.01); *H02M 7/003* (2013.01)

(58) Field of Classification Search
CPC ........ H01F 27/29; H01F 27/26; H01F 27/263; H01F 27/306; H01F 37/00; H01F 27/28;
(Continued)

(56) References Cited

U.S. PATENT DOCUMENTS 7,199,695 B1    4/2007  Zhou et al.
10,270,344 B2   4/2019  Huang et al.
(Continued)

FOREIGN PATENT DOCUMENTS

CN       1384968 A    12/2002
CN     103427597 A    12/2013
(Continued)

OTHER PUBLICATIONS

Non-Final Office Action dated Nov. 1, 2022 of U.S. Appl. No. 17/315,291.

(Continued)

*Primary Examiner* — Tuyen T Nguyen
(74) *Attorney, Agent, or Firm* — Qinghong Xu

(57) ABSTRACT

The present disclosure relates to a power module. The power module includes an inverse-coupled inductor and a plurality of half-bridge modules. The inverse-coupled inductor includes: a plurality of windings and a magnetic core. The plurality of windings are linear windings between a first plane and a second plane. The first magnetic core and the second magnetic core are located at both ends of each of the windings, the magnetic core pillars connect the first magnetic core and the second magnetic core to form a plurality of magnetic core units, and the plurality of magnetic core units surround corresponding windings in a same direction from the first plane to the second plane. Projections of the plurality of magnetic core units on the first plane form a plurality of closed areas.

18 Claims, 34 Drawing Sheets

(58) Field of Classification Search
CPC ..... H01F 41/005; H02M 7/003; H02M 1/008; H02M 3/003; H02M 3/1582; H02M 3/1584; H02M 1/00
See application file for complete search history.

(56) References Cited

U.S. PATENT DOCUMENTS

| | | | |
|---|---|---|---|
| 10,541,077 B2 | 1/2020 | Fogelberg | |
| 2002/0113679 A1 | 8/2002 | Takayama | |
| 2005/0024179 A1 | 2/2005 | Chandrasekaran et al. | |
| 2010/0232181 A1 | 9/2010 | Nakahori | |
| 2017/0250025 A1 | 8/2017 | Wei et al. | |
| 2019/0221362 A1 | 7/2019 | Jitaru | |
| 2019/0378643 A1 | 12/2019 | Zhou et al. | |

FOREIGN PATENT DOCUMENTS

| | | | | |
|---|---|---|---|---|
| CN | 105784763 A | | 7/2016 | |
| CN | 206650569 U | | 11/2017 | |
| CN | 207052414 U | | 2/2018 | |
| CN | 108022731 A | * | 5/2018 | ............ H01F 27/24 |
| CN | 108022917 A | | 5/2018 | |
| CN | 108364752 A | | 8/2018 | |
| CN | 208478093 U | | 2/2019 | |
| CN | 109525099 A | | 3/2019 | |
| CN | 108022917 B | | 11/2019 | |
| CN | 110970210 A | | 4/2020 | |
| JP | 2000114074 A | | 4/2000 | |
| JP | 2013038371 A | | 2/2013 | |
| JP | 2019087649 A | | 6/2019 | |
| JP | 2020047907 A | | 3/2020 | |

OTHER PUBLICATIONS

Yan Dong etc."Twisted Core Coupled Inductors For Microprocessor Voltage Regulators", Sep. 2008.
The 1st Office Action dated Feb. 24, 2022 for Indian patent application No. 202114020915.
The 1st Office Action dated Apr. 18, 2022 for Indian patent application No. 202114020881.
1st Office Action dated Nov. 30, 2022 of Chinese Application No. 202010387776.9.
1st Office Action dated Nov. 30, 2022 of Chinese Application No. 202010387760.8.
Huang Kai, Zhang Shen, Bei Lulu, "Novel wideband bandpress filter-based on anti-coupled line," Electronic Components and Materials, Apr. 2015, pp. 39-42.

* cited by examiner

POWER MODULE, POWER SUPPLY SYSTEM AND MULTI-PHASE INVERSE-COUPLED INDUCTOR

This application claims priority to Chinese patent application No. 202010387760.8 filed on May 9, 2020, the entire contents of which are incorporated herein by reference.

TECHNICAL FIELD

The present disclosure relates to the field of electronic power technologies, and in particular, to a power module, a power supply system and a multi-phase inverse-coupled inductor.

BACKGROUND

Recently, with development of clouds (data centers) and terminals (mobile phones, Wads, etc.), various smart ICs have more and more functions, power consumption is increasing, there are more and more devices on a motherboard, and power modules are required to have higher power density, or a single power module is required to have greater current output capability. Stacking active components and passive components can greatly reduce footprint or volume of power modules. In addition, with improvements in computing capability of the smart ICs, requirements for dynamic performance of a power supply system have increased. Multi-phase parallel power supply is an effective solution for realizing large current power supply. When both high efficiency and high dynamics are to be pursued, inverse-coupled parallel structure with two or more phases, as a good solution to improve the dynamic performance of the power supply system, are often used. Conventional power modules cannot provide power with multi-phase inverse-coupled parallel connections, or power modules that provide power using multi-phase inverse-coupled parallel connections usually have complex structures, large volume, tortuous winding lines, or long output paths, which cannot improve efficiency, and have poor heat dissipation in a vertical direction. In addition, arrangement of output pins is not convenient for customer applications, further restricting performance of the power modules.

SUMMARY

Embodiments of the present disclosure provide a power module, a power supply system, and a multi-phase inverse-coupled inductor.

According to a first aspect of the present disclosure, there is provided a power module, including an inverse-coupled inductor and a plurality of half-bridge modules disposed on the inverse-coupled inductor, and the inverse-coupled inductor includes: a plurality of windings and a magnetic core; wherein the plurality of windings are linear (straight-line shaped) windings between a first plane and a second plane and perpendicular to the first plane or the second plane, each of the plurality of windings includes one turn, and directions of current in the plurality of windings are the same, and the first plane is parallel to the second plane; the magnetic core comprises a first magnetic core, a second magnetic core and a plurality of magnetic core pillars, wherein the first magnetic core and the second magnetic core are located at both ends of each of the windings, respectively, the magnetic core pillars connect the first magnetic core and the second magnetic core to form a plurality of magnetic core units, the plurality of magnetic core units are arranged corresponding to the plurality of windings, the plurality of magnetic core units surround corresponding windings in a same direction from the first plane to the second plane, projections of the plurality of magnetic core units on the first plane form a plurality of closed areas, and the closed areas are arranged in a one-to-one correspondence with the windings; wherein the plurality of half-bridge modules corresponds to the plurality of windings one by one, and a midpoint of a bridge arm of each of the plurality of half-bridge modules is electrically coupled to a first end of a corresponding one of the plurality of windings.

According to a second aspect of the present disclosure, there is provided a power supply system, including the power module mentioned above, a system circuit board, a load disposed on a first surface of the system circuit board; wherein the power module is disposed on the first surface of the system circuit board and located around the load; and/or, the power module is disposed on a second surface of the system circuit board, and a projection of the power module on the second surface at least partially overlaps with a projection of the load on the second surface.

According to a third aspect of the present disclosure, there is provided a multi-phase inverse-coupled inductor, including two windings and a magnetic core wherein the two windings are linear windings between a first plane and a second plane, and the first plane is parallel to the second plane; and the magnetic core includes a first magnetic core, a second magnetic core, and a plurality of magnetic core pillars, wherein the first magnetic core and the second magnetic core are located at both ends of each of the windings, respectively, the magnetic core pillars connect the first magnetic core and the second magnetic core to form two magnetic core units, the magnetic core units are disposed to be in a one-to-one correspondence with the windings, the two magnetic core units surround corresponding windings in a same direction from the first plane to the second plane, projections of the two magnetic core units on the first plane form a plurality of closed areas, and the closed areas are arranged corresponding to the windings; wherein the first magnetic core and the second magnetic core are both S-shaped.

The power module of the present disclosure can realize multi-phase reverse-coupling parallel power supply through the inverse-coupled inductors and the plurality of half-bridge modules, and the inverse-coupled inductor structure including the magnetic core and the winding is relatively simple, and the linear windings are not only simple in structure, but also short in output path, thereby improving the efficiency of the power module.

BRIEF DESCRIPTION OF THE DRAWINGS

Various objectives, features and advantages of the present disclosure will become more apparent from the following detailed description of exemplary embodiments of the present disclosure in conjunction with the accompanying drawings. The drawings are merely schematic representations of the present disclosure and are not necessarily drawn to scale. The same reference numerals in the drawings denote the same or similar parts.

DETAILED DESCRIPTION

Figure 1:
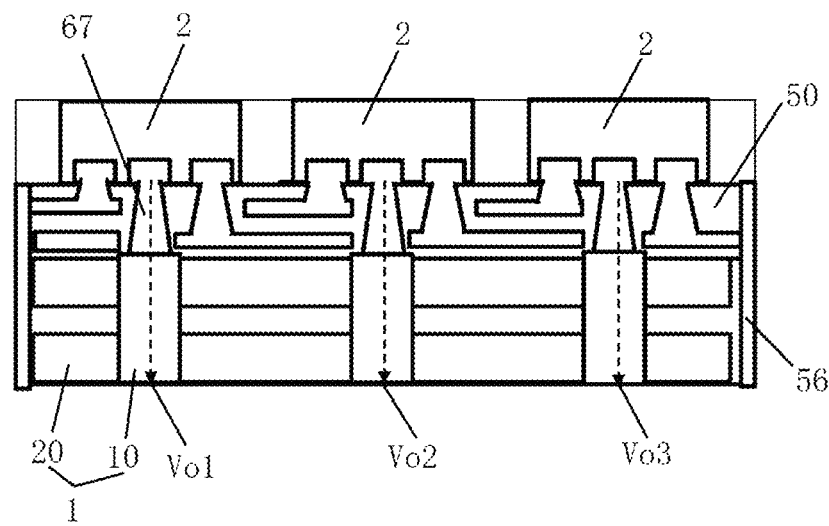
FIG. 1 is a schematic structural diagram showing a power module according to a first exemplary embodiment.

Exemplary embodiments reflecting the features and advantages of the present disclosure will be described in detail in the following description. It should be understood that the present disclosure can have various changes in different embodiments, which do not depart from the scope of the present disclosure, and the description and drawings are provided for illustrative purposes, rather than limiting the present disclosure.

Various exemplary embodiments of the present disclosure are described with reference to the accompanying drawings. The accompanying drawings constitute a part of the present disclosure and show different exemplary structures, systems, and steps that can implement various aspects of the present disclosure. It should be understood that other specific solutions of components, structures, exemplary devices, systems, and steps may be used, and structural and functional modifications may be made without departing from the scope of the present disclosure. Moreover, although the terms "above", "between", "within", etc. may be used in this specification to describe different exemplary features and elements of the present disclosure, these terms are used only for convenience in this specification, for example, these terms are used according to an exemplary direction shown in the drawings. Nothing in this specification should be construed as requiring a specific three-dimensional direction of the structure.

Embodiments of the present disclosure provide a power module. Referring to FIGS. 1 to 32, the power module includes an inverse-coupled inductor 1 and a plurality of half-bridge modules 2 disposed on the inverse-coupled inductor 1. The inverse-coupled inductor 1 includes a plurality of windings 10. The plurality of windings 10 are linear (straight) windings between a first plane and a second plane, and perpendicular to the first plane or the second plane. The first plane is parallel to the second plane. For example, the first plane may be an lower surface the inverse-coupled inductor, and the second plane may be a upper surface of the inverse-coupled inductor. Each of the windings includes one turn. Flowing directions of current in the plurality of windings 10 are the same. The directions of current in the plurality of windings 10 being same means that the current in the plurality of windings 10 all flows from the first plane to the second plane, or all flows from the second plane to the first plane.

Figure 2:
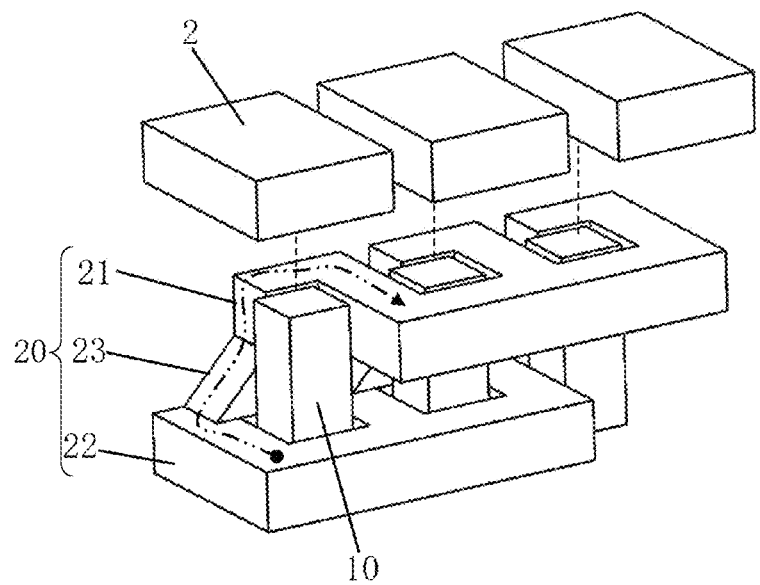
FIG. 2 is an exploded schematic structural diagram showing a power module according to a second exemplary embodiment.

As shown in FIG. 2, the inverse-coupled inductor 1 further includes a magnetic core 20. The magnetic core 20 includes a first magnetic core 21, a second magnetic core 22, and a plurality of magnetic core pillars 23. The first magnetic core 21 and the second magnetic core 22 are located at both ends of each of the windings 10, respectively. The magnetic core pillars 23 connect the first magnetic core 21 and the second magnetic core 22. The assembly of the plurality of magnetic core pillars 23, the first magnetic core 21 and the second magnetic core 22 form a plurality of magnetic core units corresponding to the windings 10. The plurality of magnetic core units surround corresponding windings 10 and extend from the first plane to the second plane in the same direction, and projections of the plurality of magnetic core units on the first plane form a plurality of closed areas 24, and the closed areas 24 are arranged in a one-to-one correspondence with the windings 10. The half-bridge modules 2 are connected to the windings 10 in a one-to-one correspondence, and a midpoint (SW point in FIG. 57) of a bridge arm of each of the half-bridge modules 2 is electrically coupled to a first end of a corresponding winding 10. In some embodiments, the half-bridge modules 2 include two switches to form a half-bridge circuit, and a connection point (that is, the midpoint) of the two switches is a SW end, which can be electrically connected to one end of a corresponding winding 10 of the inverse-coupled inductor 1.

In an embodiment, the windings 10 can be used for current transmission through a plurality of through holes, or each of the windings 10 is formed by a plurality of wires connected in parallel, the present disclosure is not limited to this. In addition, the plurality of half-bridge modules 2 are disposed on an upper side or a lower side of the inverse-coupled inductor 1.

Further, in one embodiment, a vertical projection of the midpoint of a bridge arm in a half-bridge module 2 on the first plane at least partially overlaps a vertical projection of a corresponding winding 10 on the first plane, so as to ensure that the midpoint of the bridge arm of the half-bridge module 2 is electrically coupled to the first end of the corresponding winding 10. In this way, an output path of the midpoint of the bridge arm in the half-bridge module 2 to the corresponding winding 10 is shortest, which can reduce loss accordingly.

The power module according to embodiments of the present disclosure can realize multi-phase reverse-coupling with the inverse-coupled inductor 1 and the plurality of half-bridge modules 2. The structure of the inverse-coupled inductor 1 including the magnetic core 20 and the winding 10 is relatively simple. The windings 10 of the inverse-coupled inductor 1 in the power module are vertical and short, and the power module has a short output path, small loss and volume, good heat dissipation in vertical direction, a simple and compact structure, high power density, and good manufacturability. The inverse-coupled inductor 1 can realize smaller dynamic inductance meanwhile larger static inductance. The inductor can achieve a small inductance in the dynamic state to increase the response speed, and increase the inductance in the static state to achieve a small ripple current, and the inductor has both characteristics of dynamic response capability and small static ripple. In addition, it is possible to reduce the volume or improve the efficiency by the magnetic integration and magnetic flux cancellation. In addition, a multi-phase inverse-coupled inductor with more than 2 phases can further improve the efficiency of the system, reduce the size of the power module and improve the dynamic performance, and can further reduce the number of output capacitors required by the power module.

In an embodiment, the half-bridge modules 2 are disposed in different chips, or the plurality of half-bridge modules 2 are integrated in one chip. For example, in some embodiments, the power module includes the inverse-coupled inductor 1 and a chip disposed on an upper surface of the inverse-coupled inductor 1. The chip includes at least two half-bridge circuits (or two half-bridge modules 2 are integrated in the chip). The midpoints of the bridge circuits are connected to the first ends of the corresponding windings 10 of the inverse-coupled inductor 1. Taking the inverse-coupled inductor shown in FIG. 2 as an example, it can be considered that each of the windings 10 is surrounded by a corresponding magnetic core unit which extends from the lower surface to the upper surface of the inverse-coupled inductor 1 in a same direction. For example, the two-dot chain line in FIG. 2 indicates the leftmost magnetic core unit. In FIG. 2, there are three magnetic core units, and the first ends of all the magnetic core units are connected together on the lower surface of the inverse-coupled inductor 1, and the second ends of all the magnetic core units are connected together on the upper surface of the inverse-coupled inductor 1. The vertical projections of the first end and the second end of each magnetic core unit on the first or second plane have an overlapping area, and the first end and the second end of each magnetic core unit are spaced apart from each other. Further, three half-bridge modules 2 may be disposed on the upper surface of the inverse-coupled inductor, and the midpoints of the half-bridge arms in the half-bridge module 2 are electrically connected to the first ends of the corresponding windings 10 of the inverse-coupled inductor 1.

In an embodiment, as shown in FIG. 1, the power module further includes a wiring layer structure 50 which is disposed between the inverse-coupled inductor 1 and the half-bridge module 2. The wiring layer structure 50 is used for connecting respective terminals of the half-bridge module 2 to external connection pins of the power module, and the external connection pins are used to connect the power module to other devices or modules. For example, the wiring layer structure 50 is used for connecting respective terminals of the half-bridge module to input/output pins, control signal pins, and various parameter sampling signal pins or the like. Further, the wiring layer structure 50 is used for connecting the midpoints SW of the bridge arms in the half-bridge modules 2 and the first ends of corresponding windings 10 in the inverse-coupled inductor 1. For example, the wiring layer structure 50 is provided with a plurality of conductors 67, one end of one conductor 67 is electrically connected to one midpoint of the bridge arm of a corresponding half-bridge module 2, and the other end of the conductor 67 is connected to the first end of the corresponding winding 10. The conductors 67 may be formed by a through hole or the like, which is not limited in the present disclosure. The wiring layer structure 50 can be implemented in a variety of ways. For example, the wiring layer structure 50 can be a metallization layer or Redistribution layer (RDL, such as copper metal interconnections) formed on the half-bridge modules 2, or a metallization layer formed on the upper surface of the inverse-coupled inductor 1, or a printed circuit board (PCB). In addition, vertical conductive traces 56 can be disposed on the periphery surface of the power module to connect the external connection pins of the power module and corresponding conductive layers in the wiring layer structure 50, so that the volume occupied by the circuit connections can be reduced.

Figure 3:
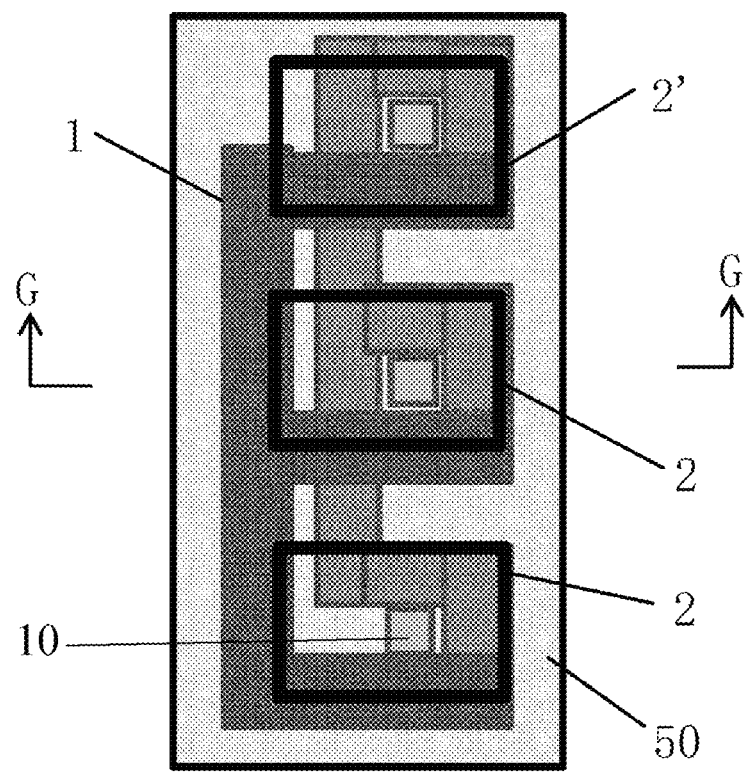
FIG. 3 is a schematic structural diagram showing a power module according to a second exemplary embodiment.
Figure 4:
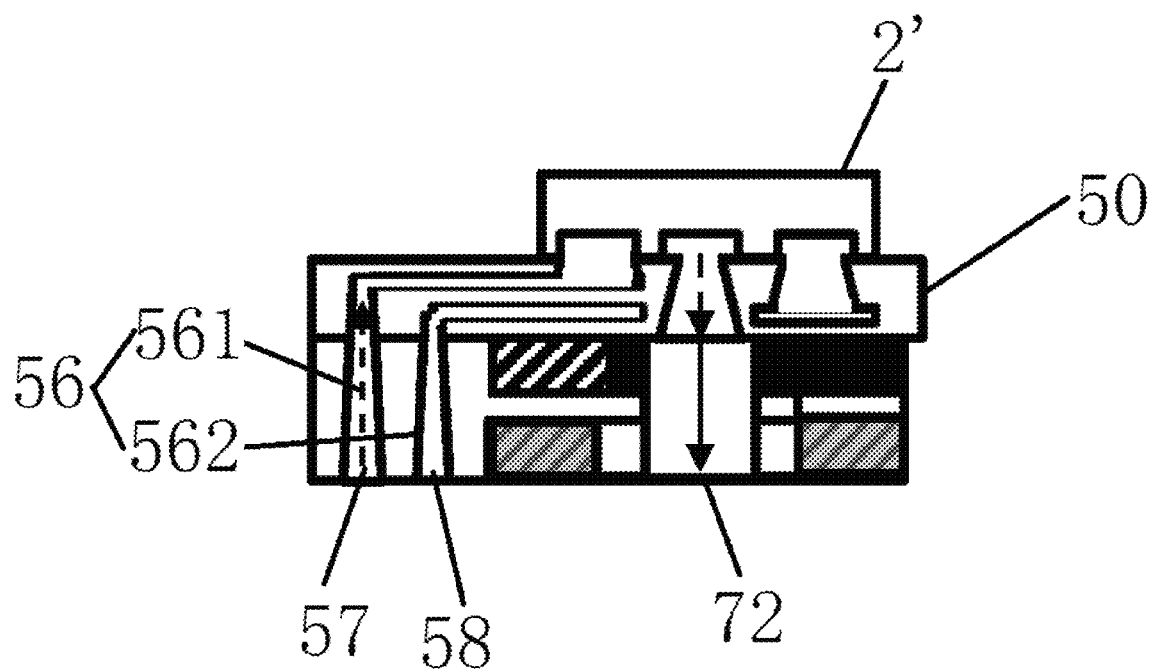
FIG. 4 is a schematic cross-sectional diagram taken along G-G in FIG. 3.
Figure 61:
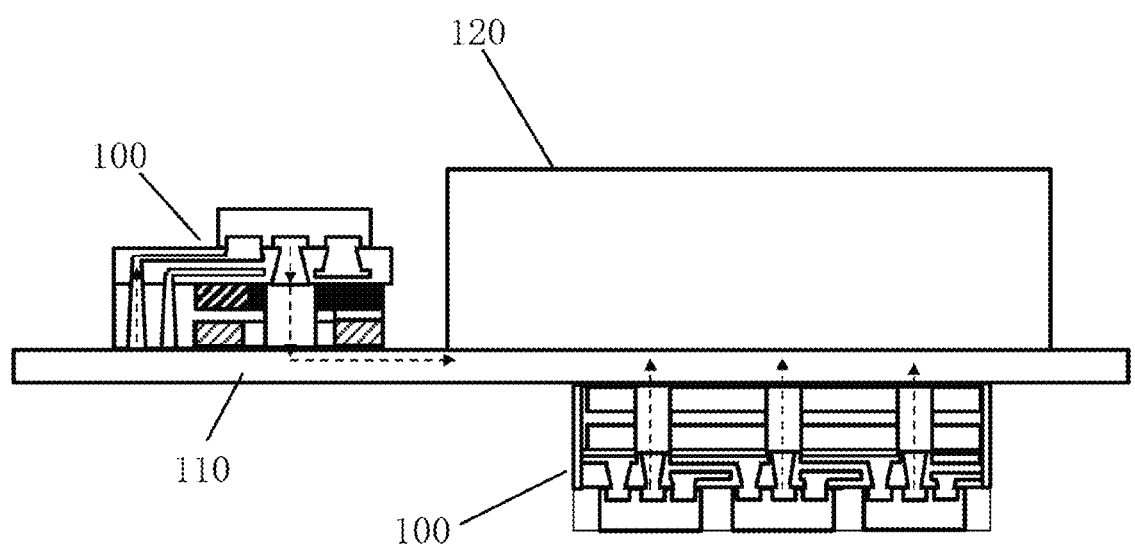
FIG. 61 is a schematic structural diagram showing a power supply system according to an exemplary embodiment.

In one embodiment, as shown in FIGS. 3 and 4, the inverse-coupled inductor 1 of the power module in FIG. 3 is a structure in which the plurality of windings 10 (such as three) are arranged in a straight line, and three chips 2' (or half-bridge modules 2) are arranged in a straight line and stacked with the corresponding windings 10 respectively. FIG. 4 is a cross-sectional view taken along G-G in FIG. 3. With this structure, a plurality of vertical conductive traces 56 can be disposed on the left side shown in FIG. 3. For example, the vertical conductive traces 56 includes a positive input trace 561 and a negative input trace 562. The positive input trace 561 and the negative input trace 562 form a positive input pin 57 and a negative input pin 58 on the lower surface of the power module. With this structure, an electrical load 120 (not shown in FIG. 3) can be arranged on the right side of the power module conveniently, for example, as shown in FIG. 61. The magnetic core of the inverse-coupled inductor 1 shown in FIG. 3 is just for schematic, and may differ from the top view of the cores in FIG. 2 slightly.

Figure 5:
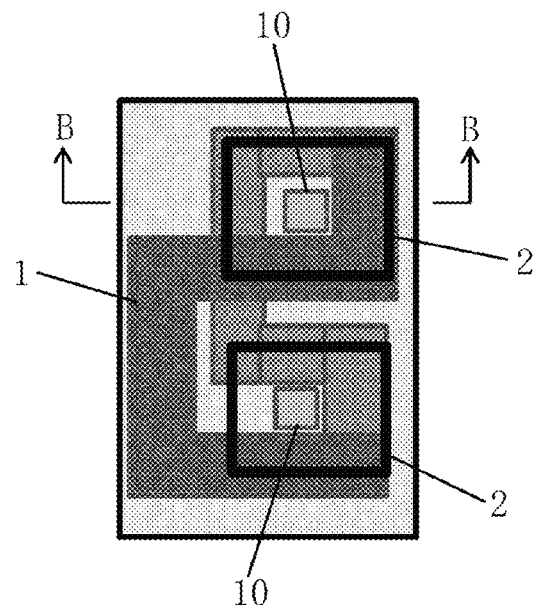
FIG. 5 is a schematic structural diagram showing a power module according to a third exemplary embodiment.

FIG. 5 is a top view of a power module according to an embodiment of the present disclosure. The power module includes a two-phase inverse-coupled inductor and two half-bridge modules 2 disposed on the upper surface of the two-phase inverse-coupled inductor. The half-bridge modules 2 correspond to the windings 10 of the two-phase inverse-coupled inductor, respectively. Furthermore, the projections of the half-bridge modules 2 and the windings 10 on the first plane or second plane partially overlap, and this arrangement makes the output path of the midpoint of each half-bridge circuit short and compact in structure.

Figure 6:
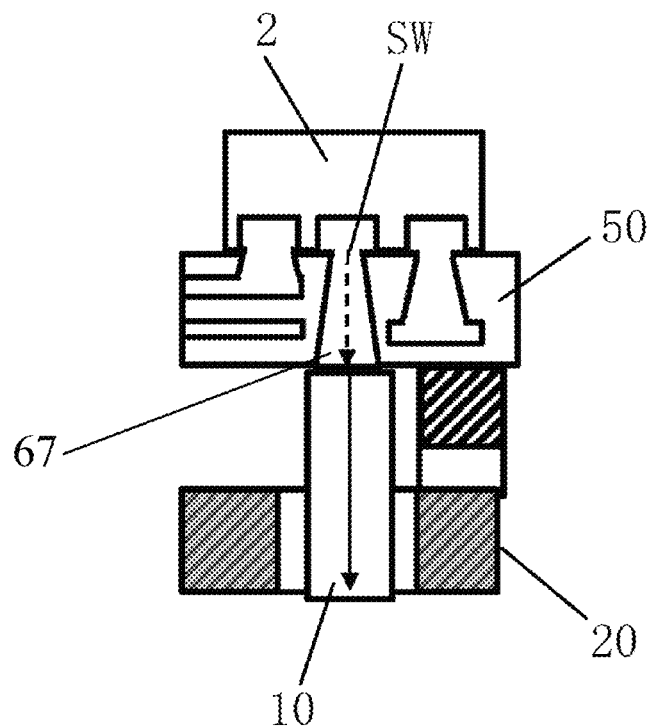
FIG. 6 is a schematic cross-sectional structure diagram taken along B-B in FIG. 5.

FIG. 6 is a sectional view taken along B-B in FIG. 5. The midpoint SW of the bridge arm in a half-bridge module 2 is connected to a windings 10 by a conductor 67 in the wiring layer structure 50. In this embodiment, the midpoint SW of the bridge arm in the half-bridge module 2 is directly connected to the corresponding winding in a straight line, so that the output path for the midpoint of each half-bridge circuit is shortest and the structure is the most compact.

Figure 7:
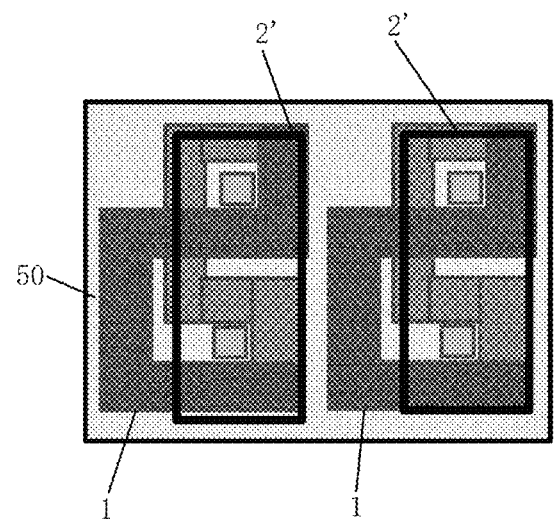
FIG. 7 is a schematic structural diagram showing a power module according to a fourth exemplary embodiment.

In some embodiments, the power module may also be provided with a plurality of inverse-coupled circuits. As shown in FIG. 7, it is possible to provide two two-phase inverse-coupled circuits in the same power module. The power module further includes two chips 2', each of which has four switches to form two half-bridge circuits. Each chip 2' and the inverse-coupled inductor 1 form a two-phase inverse-coupled circuit, and the two chips 2' can be disposed on the upper surface of the same wiring layer structure 50, and the two inverse-coupled inductors 1 are both disposed on the lower surface of the wiring layer structure 50 to form the power module with multiple inverse-coupled circuits.

In one embodiment, the inverse-coupled inductor 1 is a three-phase inverse-coupled inductor in which three windings 10 are distributed in an array. The array distribution of the three windings 10 is an equilateral triangle arrangement or a right-angled triangle arrangement. A reserved space (that is, the space not occupied by the inverse-coupled inductor in the footprint space of the rectangular power module) is formed in the power module. The power module also includes: a controller 51 and a peripheral electronic device disposed in the reserved space. The peripheral electronic device may be located on one side of the wiring layer structure 50, and the controller 51 may be located on the other side of the wiring layer structure 50. In addition to integrating the inverse-coupled inductor and the half-bridge module 2 in the power module, the controller 51 and other peripheral electronic devices are also integrated in the power module, and the space arrangement between the various components is relatively reasonable.

Figure 8:
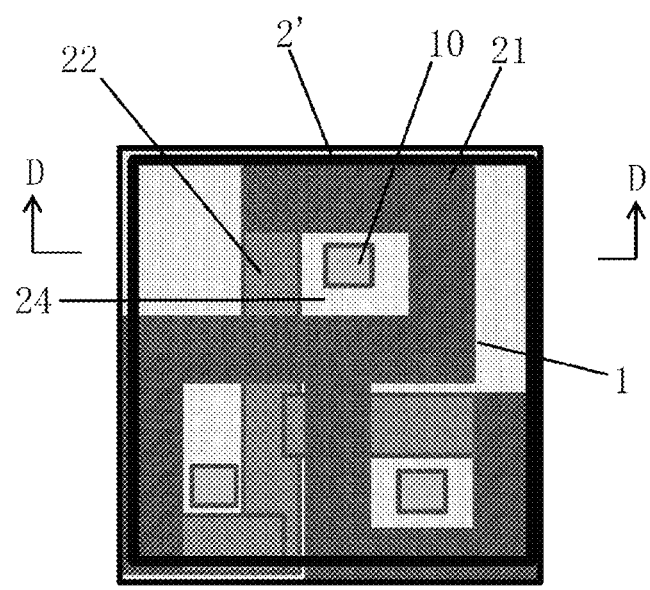
FIG. 8 is a schematic structural diagram showing a power module according to a fifth exemplary embodiment.
Figure 9:
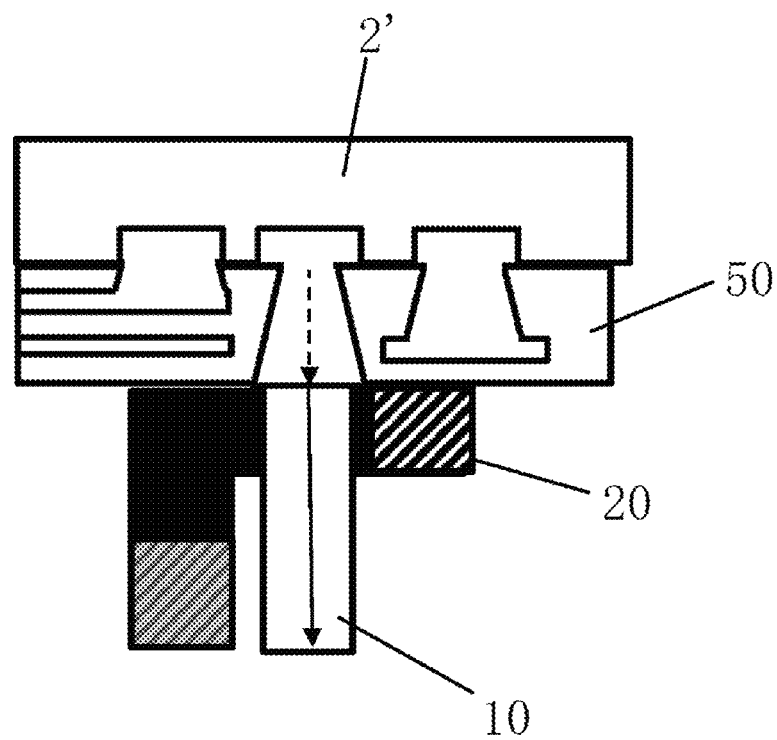
FIG. 9 is a schematic cross-sectional structure diagram taken along D-D in FIG. 8.

As shown in FIG. 8 and FIG. 9, FIG. 9 is a schematic cross-sectional structure diagram taken along D-D in FIG. 8. The power module is a three-phase inverse-coupled power module, and the three-phase inverse-coupled inductor is designed similar to an equilateral triangle. The three-phase inverse-coupled power module includes a passive component, such as the inverse-coupled inductor 1 and the wiring layer structure 50. The inverse-coupled inductor 1 includes the magnetic core 20 and the windings 10. The chip 2' includes six switches to form three half-bridge circuits. The midpoint of each half-bridge circuit is electrically connected to a corresponding winding 10, and preferably, the projection of the midpoint of each half-bridge circuit partially overlaps the projection of the corresponding winding 10 on the upper surface of the power module. The distribution of the three windings 10 is like an equilateral triangular, and the coupling between the three inverse-coupled inductors 1 is balanced and consistent, which can improve the output performance, dynamic performance and efficiency of the multi-phase inverse-coupled power module, and is beneficial to increasing power density.

Figure 10:
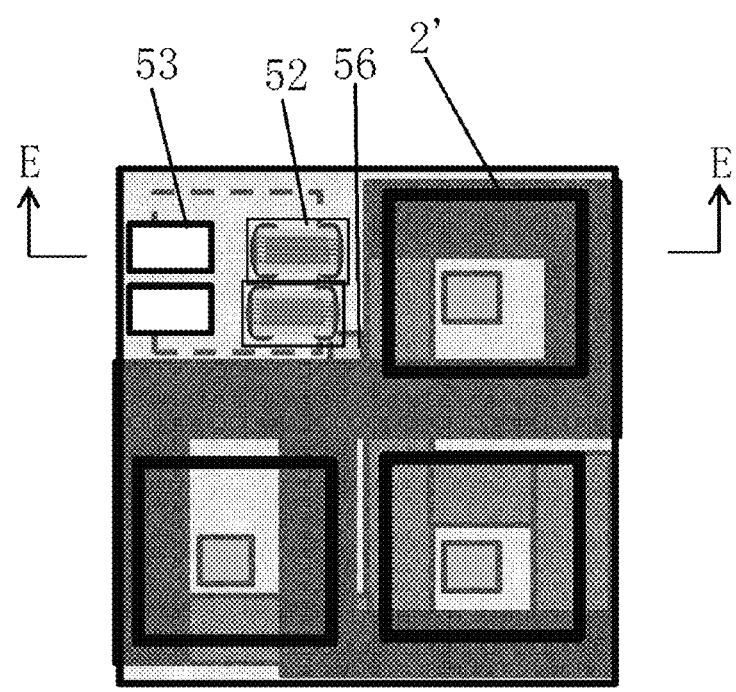
FIG. 10 is a schematic structural diagram showing a power module according to a sixth exemplary embodiment.
Figure 11:
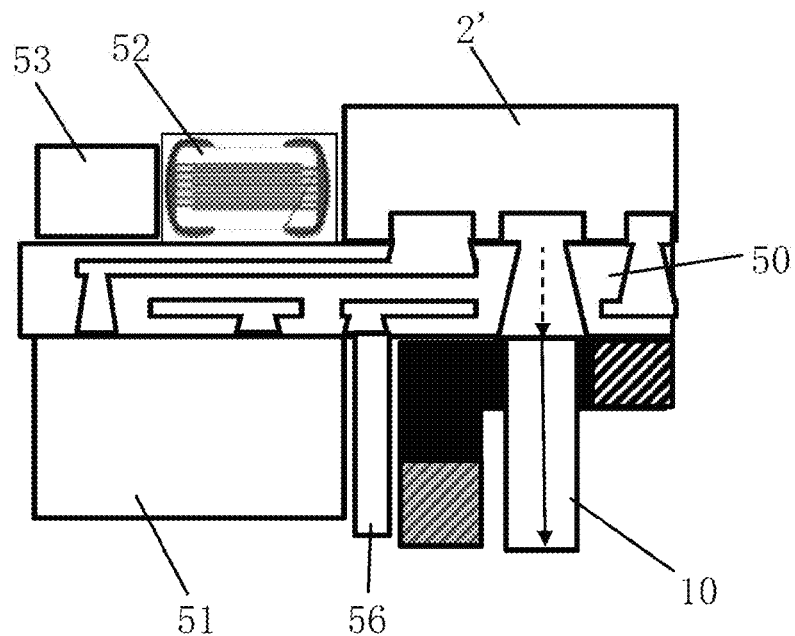
FIG. 11 is a schematic cross-sectional structure diagram taken along E-E in FIG. 10.
Figure 12:
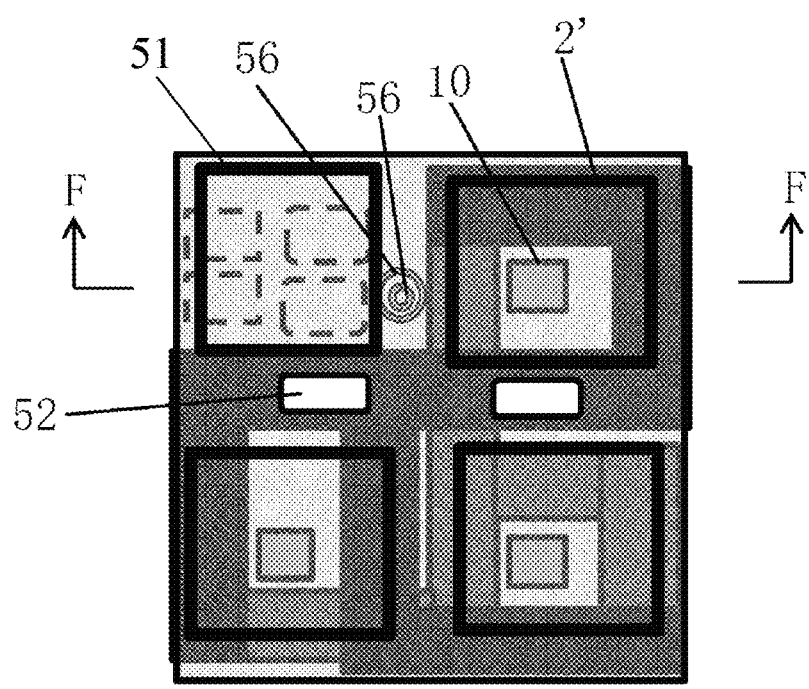
FIG. 12 is a schematic structural diagram showing a power module according to a seventh exemplary embodiment.

In one embodiment, as shown in FIGS. 10 to 13, the power module is a three-phase inverse-coupled power module. The magnetic core 20 is arranged in an L-shaped array, and the upper left corner of FIG. 10 can reserve room (that is, the reserved space), for example, for the controller 51 and other devices, such as capacitors 52 or resistors 53, etc. As shown in FIG. 11, the controller 51 can be disposed on the lower side of the wiring layer structure 50, that is, the controller 51 and the inverse-coupled inductor are disposed on one side, and the upper area of the wiring layer structure 50 corresponding to the controller 51 can be provided with the peripheral devices of the controller, such as the capacitors 52 and the resistors 53, and can also be provided with peripheral devices of each chip 2', such as the capacitors or the resistors. In the embodiments illustrated in FIGS. 10 and 11, the controller 51 can also be disposed on the upper side of the wiring layer structure 50, as shown in FIG. 12, and the arrangement can be adjusted according to application scenarios. Generally, such a layout can improve the power density of the multi-phase (such as three-phase) power module and can well integrate the controller or other circuits, such as current sampling circuit or communication circuit.

In some embodiments, a vertical conductive trace 56 may also be provided in the reserved space, as shown in FIG. 10 and FIG. 11. The vertical conductive trace 56 provided in this area can be used as the output trace of the chip 2', and in this way, the input path of each chip 2' can be made shorter and more consistent. In some embodiments, the vertical conductive trace 56 may include the positive input trace 561 and the negative input trace 562 (for example, Vin conductive trace and GND conductive trace) and a signal conductive trace 59.

Figure 13:
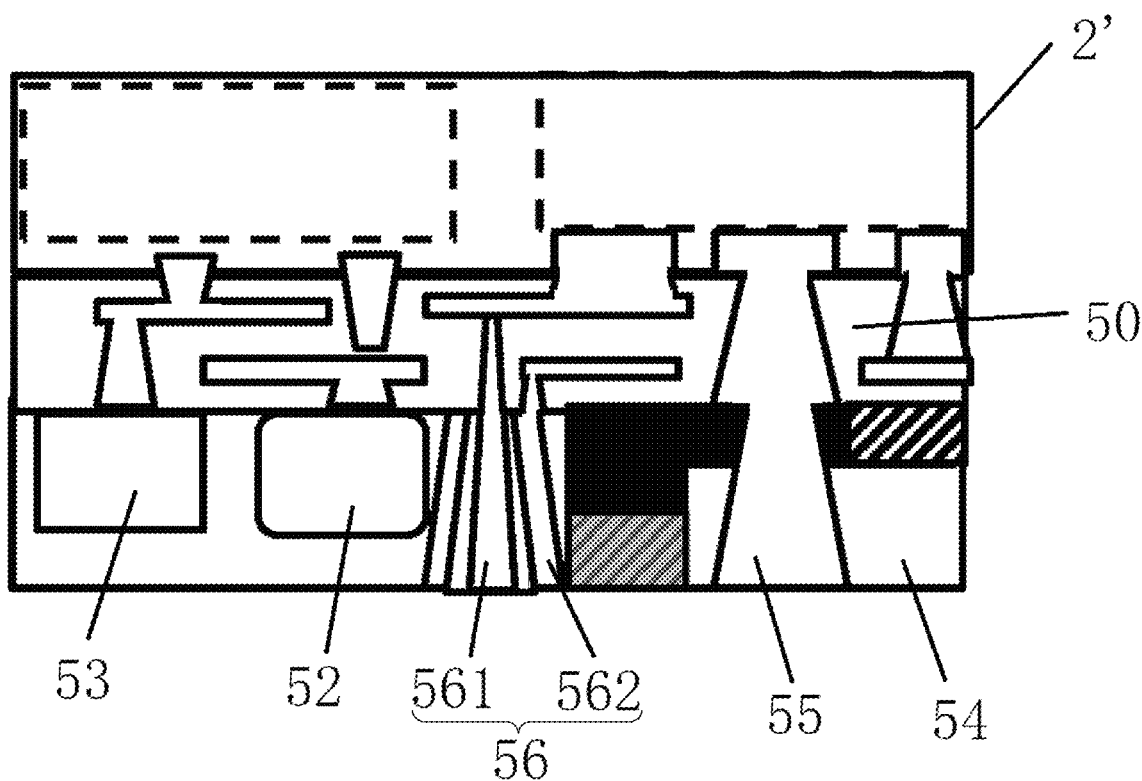
FIG. 13 is a schematic cross-sectional structure diagram taken along F-F in FIG. 12.

Further, in some embodiments, the chip 2' shown in FIG. 13 may also be integrated with a half-bridge circuit and a driving circuit. For example, a half-bridge circuit area and a driving area are provided in the chip 2', and the half-bridge circuit area may correspond to the magnetic core 20, and the driving area may correspond to the reserved space. The driving circuit or the signal processing circuit of the half-bridge circuit is disposed in the driving area, and the midpoint of the half-bridge circuit in the half-bridge circuit area is electrically connected to a corresponding winding 10, so that a more compact structure can be formed. Other devices, such as the capacitor 52 or the resistor 53, etc. can be disposed on the lower side of the wiring layer structure 50 corresponding to the driving area.

Further, in some embodiments, the lower surface of the wiring layer structure 50 can also be packaged with an insulating encapsulation material to form the encapsulation layer 54, which improves the stability and strength of the overall structure and facilitates to protect the inverse-coupled inductor 1 and the capacitor 52 and the resistor 53, etc. In addition, a conductive via 55 can be provided in the insulating encapsulation material, and the conductive via 55 directly forms the winding 10 of the inverse-coupled inductor 1. The upper end of the conductive via 55 is electrically connected to the midpoint of the half-bridge circuit in the half-bridge circuit area through the wiring layer structure, and the other end (lower end) of the conductive via 55 is led out on the lower surface of the power module and can be used as the output pin of the power module. Such arrangement can simplify the structure of the inverse-coupled inductor and increase the power density of the power module.

In some embodiments, the encapsulation layer 54 may also be provided with vertical conductive traces 56. Specifically, the vertical conductive traces 56 include the positive input trace 561 and the negative input trace 562 (for example, Vin conductive trace and GND conductive trace). The positive input trace 561 and the negative input trace 562 are nested concentrically, and the positive input trace 561 and the negative input trace 562 are insulated, for example, an insulating material is disposed between the two or the insulation is directly performed by the insulating encapsulation material. The positive input trace 561 can be used for the connection of positive electrode of the input, and the negative input trace 562 can be used for the connection of the negative electrode of the input. Such structure can make the positive input trace 561 less susceptible to interference from the nearby inverse-coupled inductor 1 and improve the stability and reliability of the power module. Further, the vertical conductive trace 56 can also be used as the signal conductive trace, which is not limited in the present disclosure. In general, the chip 2' of the power module of the present disclosure can be arranged flexibly according to actual application scenarios. According to some embodiments, the upper surface of the wiring layer structure 50 can also be packaged.

Figure 14:
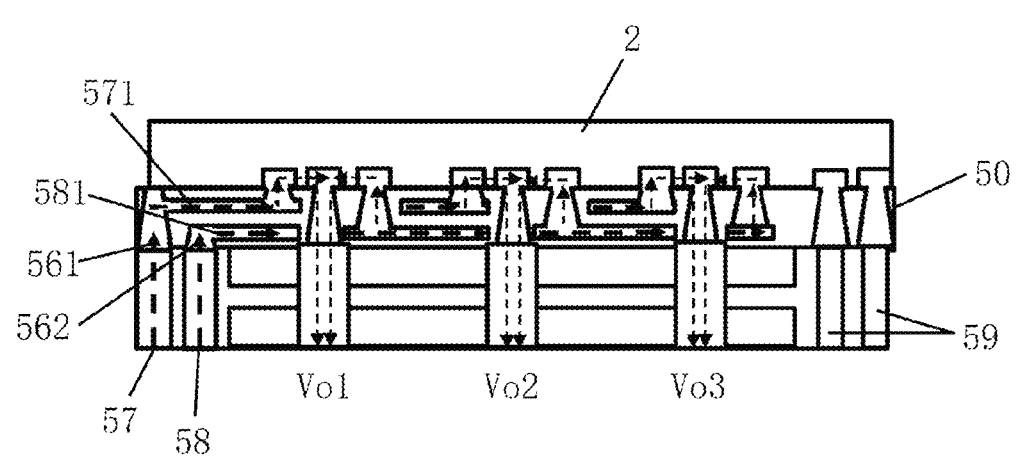
FIG. 14 is a schematic structural diagram showing a power module according to an eighth exemplary embodiment.
Figure 15:
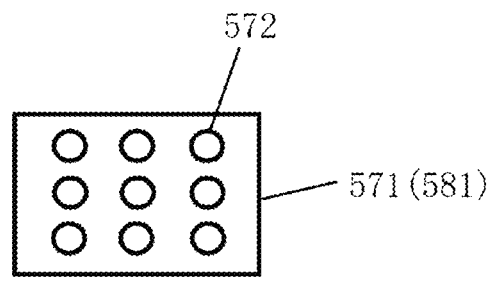
FIG. 15 is a schematic structural diagram showing a first wiring layer structure or a second wiring layer structure of a power module according to an exemplary embodiment.
Figure 16:
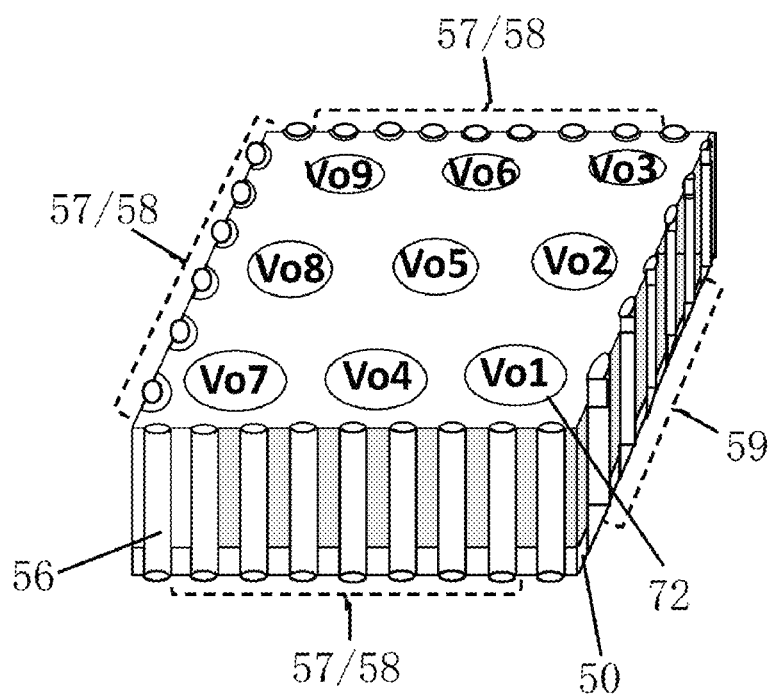
FIG. 16 is a schematic structural diagram showing a power module according to a ninth exemplary embodiment.

In one embodiment, FIGS. 14 to 16 illustrate a power module with 3×3 array. FIG. 14 is a schematic cross-sectional view of the power modules. The wiring layer structure 50 includes a first conductive layer 571 and a second conductive layer 581, for example, serving as a Vin conductive layer or a GND conductive layer. The first conductive layer 571 is connected to the positive input pin 57 via the positive input trace 561, and the second conductive layer 581 is connected to the negative input pin 58 via the negative input trace 562. FIG. 15 illustrates the first conductive layer 571 or the second conductive layer 581. The first conductive layer 571 or the second conductive layer 581 can be considered a whole conductive layer, and the entire first conductive layer 571 and the entire second conductive layer 581 are provided with vias 572 inside to avoid the conductors 67 which connect the midpoints of the half-bridge circuits and corresponding windings 10. The use of a structure with large-area copper can reduce the impedance and loss by increasing the conductive area of the Vin conductive layer or the GND conductive layer. FIG. 16 is a bottom view of the power modules. For example, the second ends of the windings 10 can be directly connected to multiple pads on the lower surface of the power module to form positive output pins 72 (for example, Vo1-Vo9 in the figure). Alternatively, Vo1 to Vo9 can be electrically connected together to form a large positive output pin by one pad (for example, directly form a large Vo).

Further, as shown in FIG. 16, the positive input pins 57, the negative input pins 58 (the positive input traces 561, the negative input traces 562) and the signal conductive traces 59 can be arranged on the peripheral side of the power module and be electrically connected to the respective conductive layer in the wiring layer structure 50. In an embodiment, for example, the pins may be formed in a stamp hole shape pads; alternatively, the pins may be formed by vertical conductive through holes, that is, the pins or holes are not exposed on the side of the power module. In addition, the positive input pins 57 and the negative input pins 58 (the positive input traces 561, the negative input traces 562) can also be interleaved. The parasitic inductance of the input circuit can be further reduced by interleaved arrangement of the Yin conductive trace and the GND conductive trace, which is beneficial to improving the high frequency performance of the power module. In addition, this structure is simple and compact and has a high power density.

Figure 17:
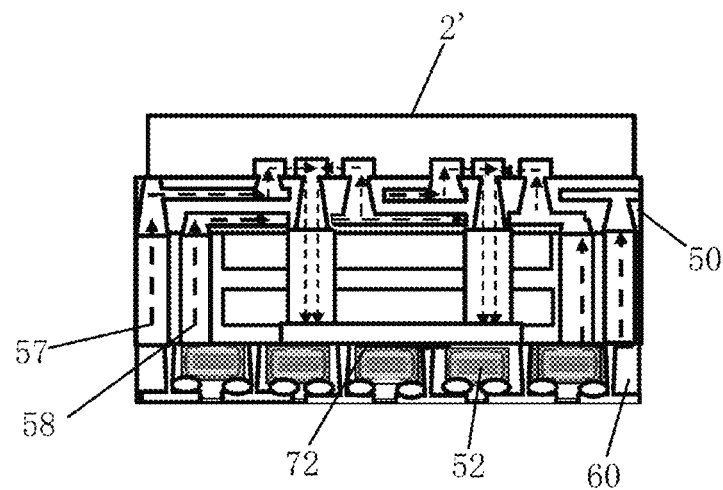
FIG. 17 is a schematic structural diagram showing a power module according to a tenth exemplary embodiment.
Figure 18:
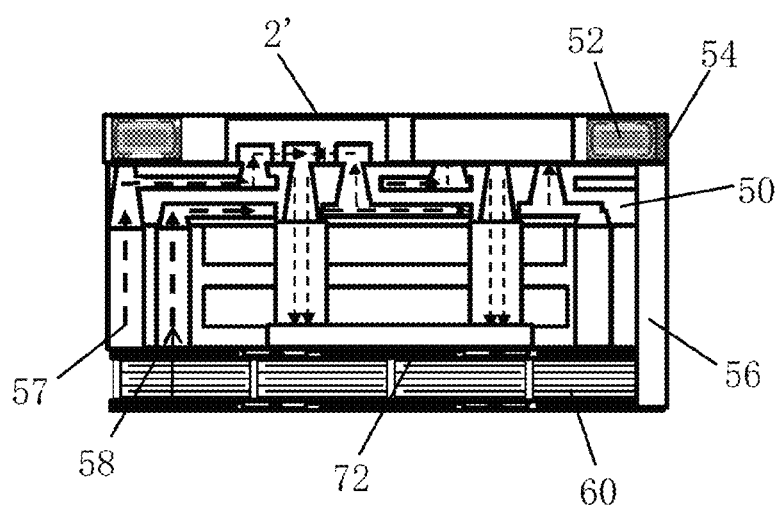
FIG. 18 is a schematic structural diagram showing a power module according to an eleventh exemplary embodiment.

In one embodiment, the power module further includes a capacitor layer structure 60, disposed on the side of the inverse-coupled inductor 1 away from the chip 2'. As shown in FIG. 17, the capacitor layer structure 60 is disposed under the inverse-coupled inductor 1. The capacitor layer structure 60 includes a plurality of capacitors 52, for example, the capacitors 52 are used as an output capacitor Co of the circuit, and the capacitors 52 are connected to the positive output pins 72. In other embodiments, the capacitors 52 can also be used as an input capacitor Cin of the circuit. FIG. 18 shows that the capacitor layer structure 60 can also be a whole-layer structure provided with a plurality of terminals to be connected to the corresponding input or output pins of the power module. The use of such a capacitor layer structure can achieve a more compact structure or a larger capacitance value. In addition, FIG. 18 shows that the insulating encapsulation material can be used on the upper side of the wiring layer structure 50 to package the chip 2' and the capacitor 52, etc., to form the encapsulation layer 54, so as to improve the reliability of the module and facilitate the installation of a heat sink on the upper surface to heat dissipation. FIG. 18 also shows that a vertical conductive trace 56 is disposed on the side of the power module to realize electrical connection between the capacitive layer 60 and a corresponding conductive layer in the wiring layer structure 50. According to some embodiments, the vertical conductive trace 56 can also be used to connect external pins of the power module.

Figure 19:
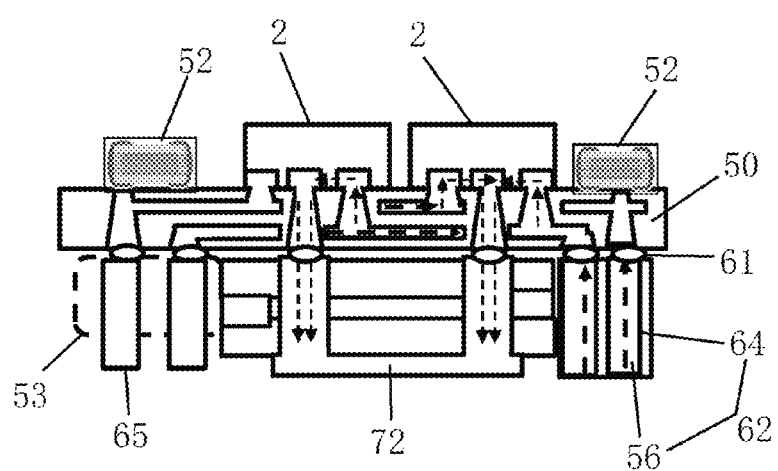
FIG. 19 is a schematic structural diagram showing a power module according to a twelfth exemplary embodiment.

In an embodiment, as shown in FIG. 19, the wiring layer structure 50 may be a printed circuit board (PCB), and the half-bridge modules 2 or peripheral devices such as capacitors may be provided on the upper surface of the printed circuit board (PCB). The inverse-coupled inductor 1 is provided on the lower surface of the wiring layer structure 50. For example, the first end of each winding 10 of the inverse-coupled inductor 1 is soldered to a corresponding pad on the lower surface of the wiring layer structure 50 through a solder joint 61. A conductive trace module 62 can also be provided next to the inverse-coupled inductor 1. The conductive trace module 62 includes the vertical conductive trace 56, and a plurality of vertical conductive traces 56 can be formed in the conductive trace module 62, and the plurality of vertical conductive traces 56 are separated by insulating material 64. For example, the vertical conductive traces 56 can be used as the Vin conductive trace, the GND conductive trace, or the signal conductive trace, etc. The conductive trace module 62 can be welded to the wiring layer structure 50 through the solder joints 61. In an embodiment, a copper block 65 may also be provided, and the copper block 65 may be connected to the wiring layer structure 50 through the solder joint 61. Other devices, such as capacitor 52, etc. can also be disposed beside the inverse-coupled inductor 1. This structure is simple and easy to manufacture, and mainly adopts conventional SMT and reflow soldering processes, which is beneficial to costs reduction.

Figure 20:
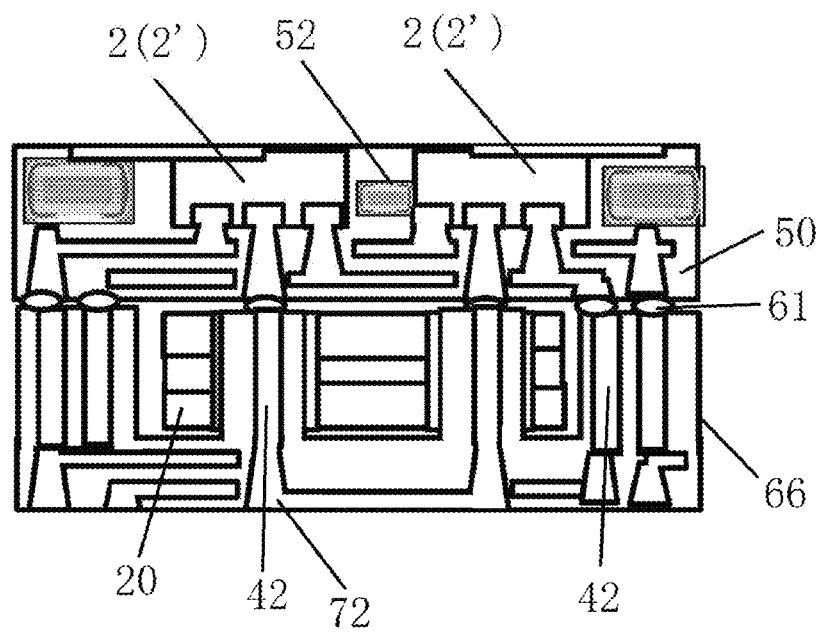
FIG. 20 is a schematic structural diagram showing a power module according to a thirteenth exemplary embodiment.
Figure 21:
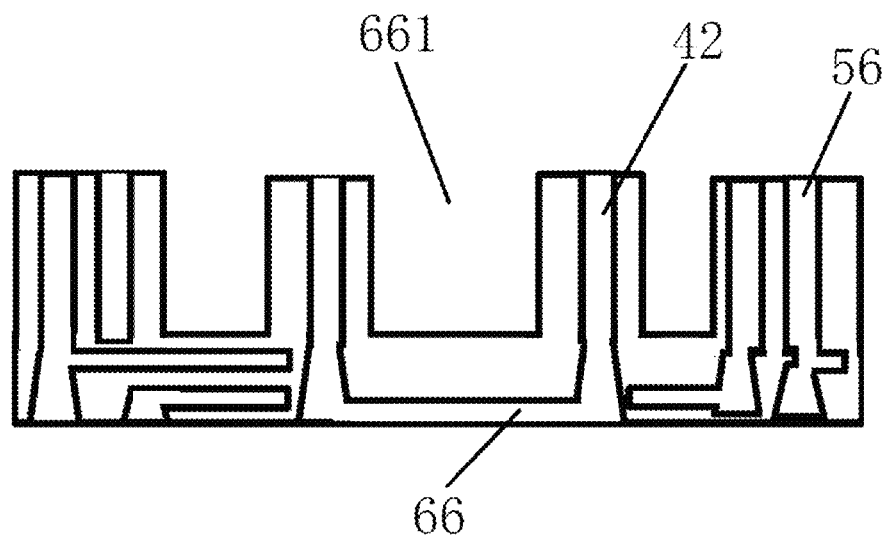
FIG. 21 is a first structural schematic diagram showing a circuit board of a power module according to an exemplary embodiment.
Figure 22:
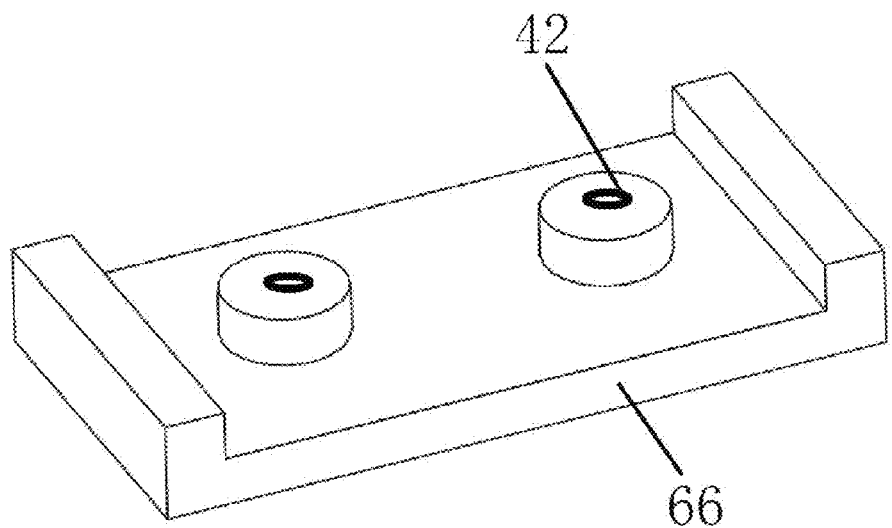
FIG. 22 is a second structural schematic diagram showing a circuit board of a power module according to an exemplary embodiment.

In one embodiment, as shown in FIG. 20, the half-bridge modules 2 or the chips 2' can be buried in the wiring layer structure 50 to facilitate the interconnections between multiple chips 2', thereby improving the compactness of the structure. Capacitors 52 can be disposed between the chips 2', for example, as the input capacitor Cin. Multiple half-bridge circuits can share this capacitor 52, so that ripple of the input circuit between multiple half-bridge circuits can be reduced. In addition, FIG. 20 shows the use of a special-shaped circuit board 66, FIG. 21 illustrates a cross-sectional view of the structure of the special-shaped circuit board, and FIG. 22 illustrates a three-dimensional schematic diagram of FIG. 21. The special-shaped circuit board 66 is provided with a groove 661 and a protrusion structure. The magnetic core 20 is disposed in the groove 661 of the special-shaped circuit board 66, and the protrusion structure passes through the magnetic core unit formed by the magnetic core 20. The conductive via 42 is disposed in the protrusion structure, and the conductive via 42 directly forms the windings 10 of the inverse-coupled inductor 1. The special-shaped circuit board 66 and the wiring layer structure 50 are connected through the solder joints 61, as shown in FIG. 20, to realize the electrical connection between the wiring layer structure 50 and the windings 10. In an embodiment, a vertical conductive trace 56 may also be formed by other conductive via for electrical connection of input circuits or signals. With such a compact and concise structure, the power module can make pins directly protrude out from the lower surface of the special-shaped circuit board 66, the coplanarity of the pins is easy to realize, and the manufacturing cost is low.

Figure 23:
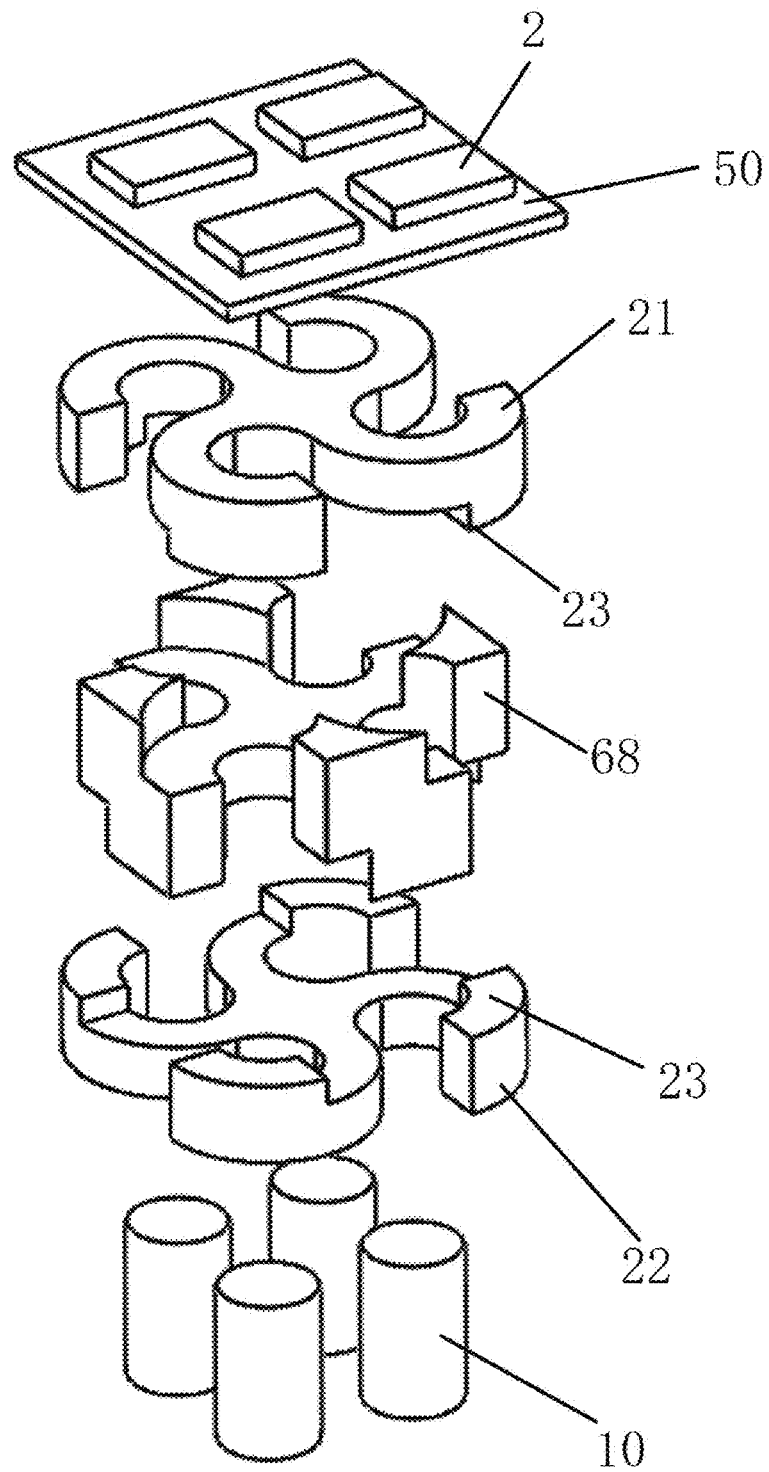
FIG. 23 is an exploded schematic structural diagram showing a power module according to a fourteenth exemplary embodiment.
Figure 24:
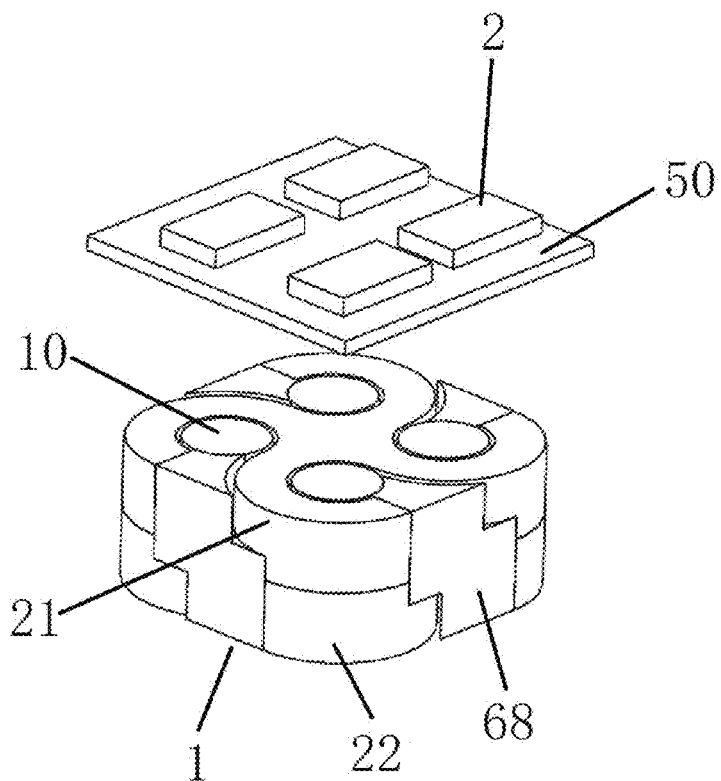
FIG. 24 is a partially exploded schematic structural diagram showing a power module according to a fourteenth exemplary embodiment.
Figure 25:
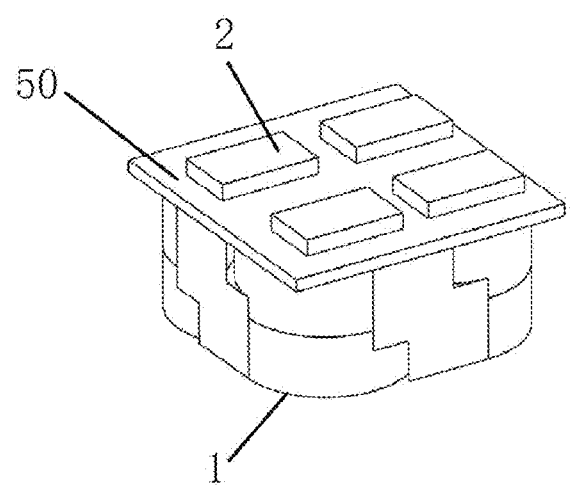
FIG. 25 is a schematic structural diagram showing a power module according to a fourteenth exemplary embodiment.
Figure 26:
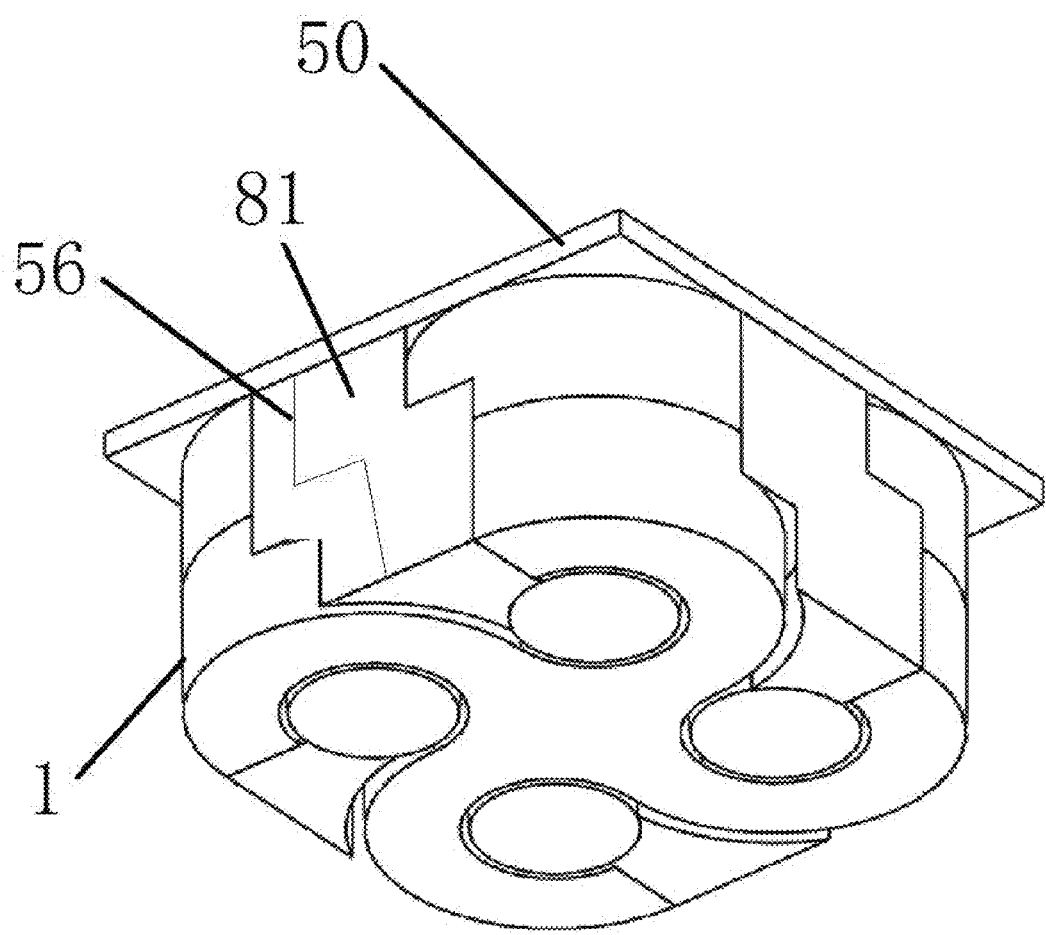
FIG. 26 is a schematic structural diagram showing a power module according to a fifteenth exemplary embodiment.
Figure 27:
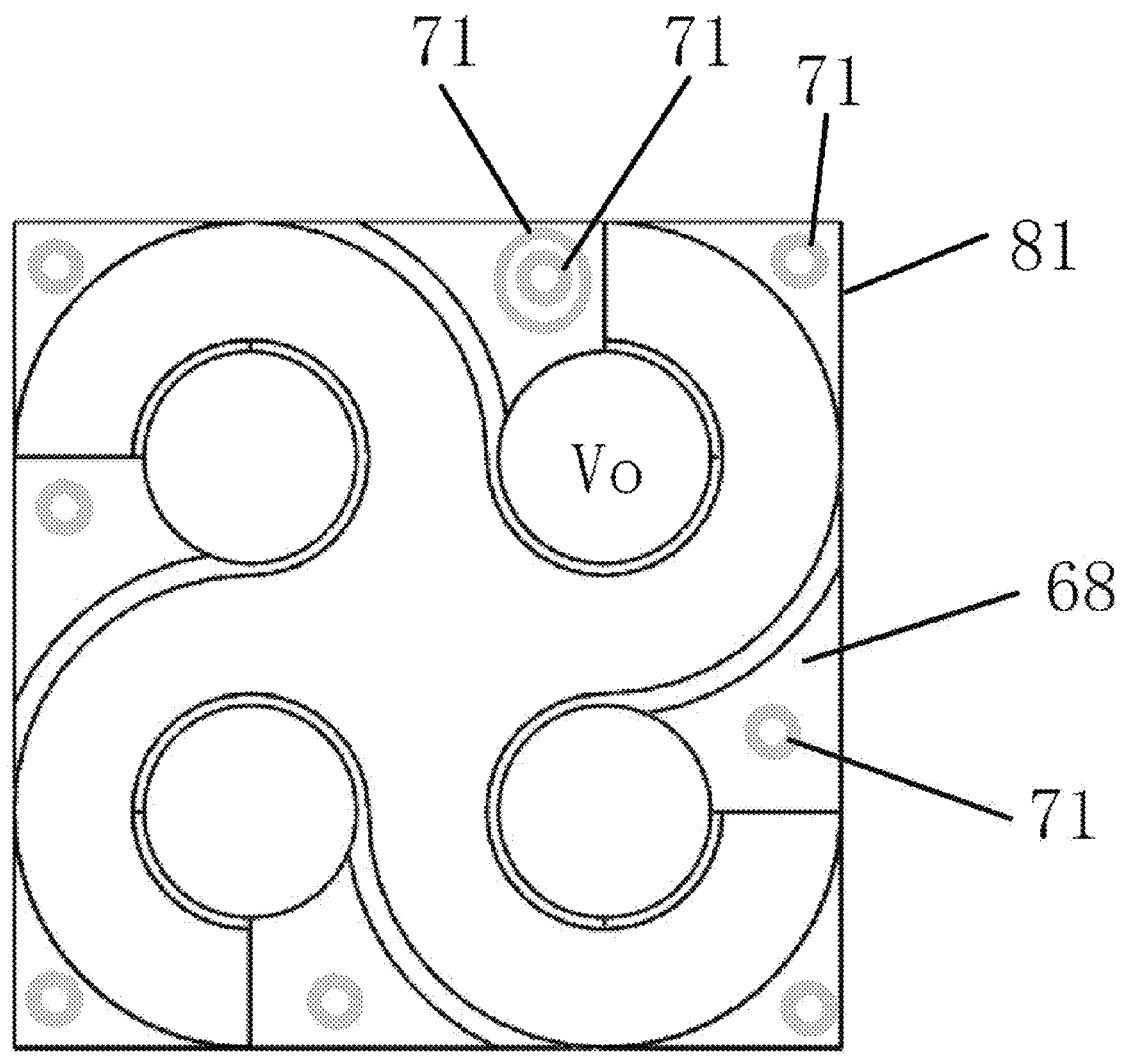
FIG. 27 is a schematic structural bottom view showing a power module according to a sixteenth exemplary embodiment.
Figure 28:
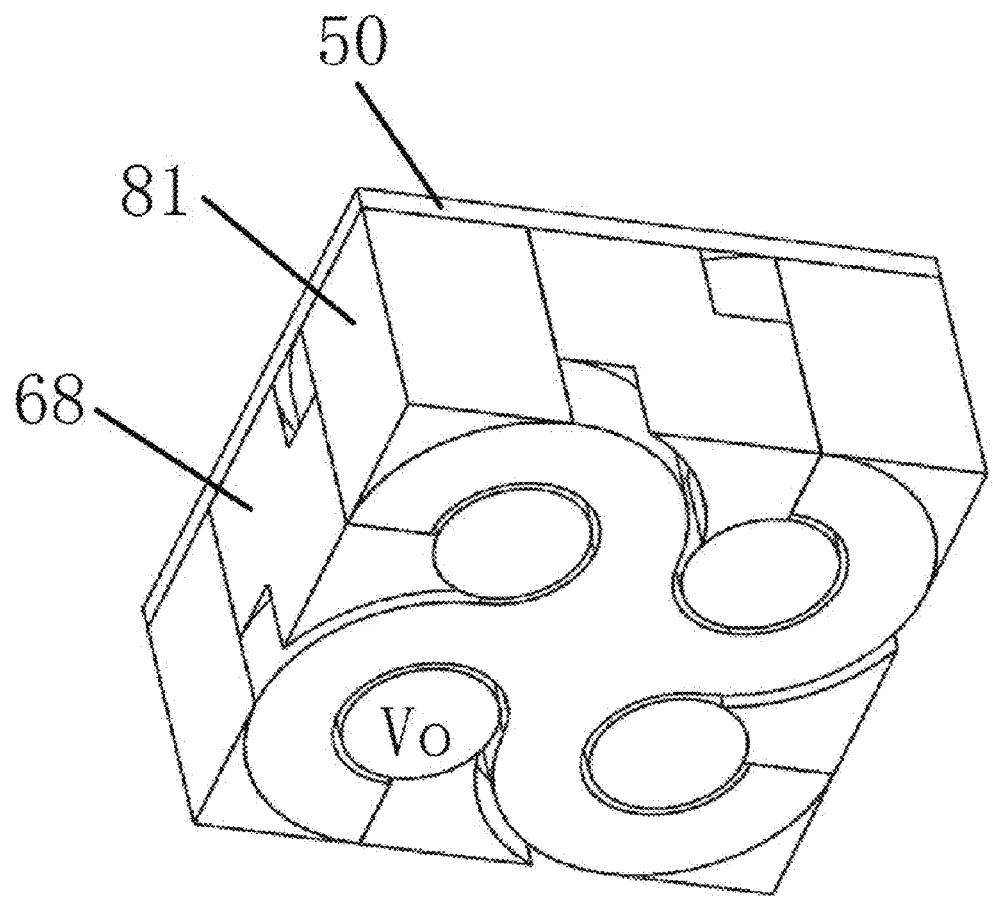
FIG. 28 is a schematic structural diagram showing a power module according to a sixteenth exemplary embodiment.

In an embodiment, FIGS. 23 to 28 illustrate a schematic diagram of a four-phase inverse-coupled power module. FIG. 23 is an exploded view of a four-phase inverse-coupled power module, FIG. 24 is an assembly diagram of a four-phase inverse-coupled power module, FIGS. 25 to 26 show three-dimensional schematic diagrams of the power module from different perspectives, and FIG. 27 shows a bottom view of the power module. As shown in FIG. 23, four half-bridge modules 2 are provided on the wiring layer structure 50, and the inverse-coupled inductor 1 includes the first magnetic core 21, the second magnetic core 22, four windings 10 and an isolation plate 68. The inverse-coupled inductor 1 is disposed in a 2×2 array with symmetrical structure, and the magnetic path is short and symmetrical, which is beneficial to improving the efficiency and dynamic performance of the power module. The isolation plate 68 is assembled with the first magnetic core 21, the second magnetic core 22 and the winding 10 to form the inverse-coupled inductor 1 as shown in FIG. 24. The material of isolating plate 68 is similar to the special-shaped circuit board 66 in FIG. 21, and the isolating plate 68 has protrusion structures on the upper and lower surfaces that match the magnetic cores. In addition, the inverse-coupled inductor can be packaged with the insulating encapsulation material 81, as shown in FIG. 27. Further, the vertical conductive traces 56 may be disposed in the isolation plate 68 or the insulating encapsulation material 81. The vertical conductive traces 56 form pads on the lower surface of the isolation plate 68 or the insulating encapsulation material 81 as the external connection pins 71 of the power module. Two adjacent connection pins 71 may be a concentric ring nested structure, that is, the vertical conductive traces 56 can be nested concentrically, which is beneficial to improving the reverse-interference performance of the electrical connection traces of the connection pins 71 in the middle. Further, the second ends of the windings 10 of the inverse-coupled inductor 1 may directly form a positive output pin 72 (for example, output pin Vo1 on the lower surface by a pad. Since the outer side of the inverse-coupled inductor 1 is also arc-shaped, devices or vertical conductive traces 56 can be disposed in the four corner areas of the power module. For example, the connection pins 71 are disposed as shown in FIG. 27. In this way, the space utilization of each part of the power module is increased, and the power density is improved.

Figure 29:
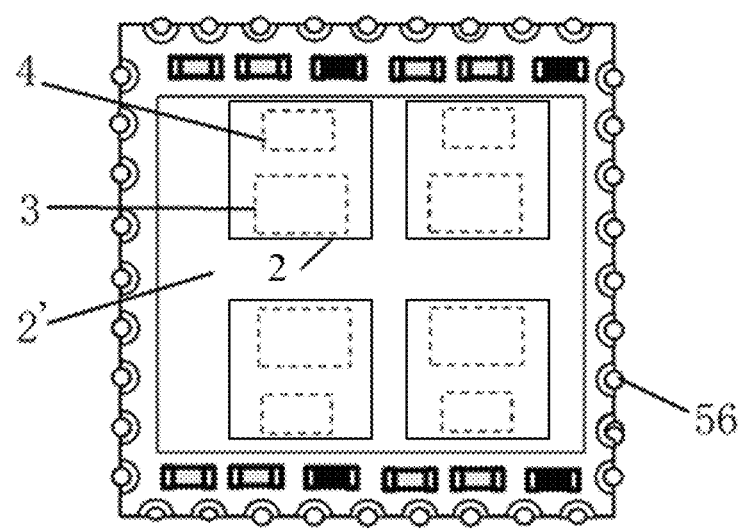
FIG. 29 is a schematic structural top view showing a power module according to a seventeenth exemplary embodiment.
Figure 30:
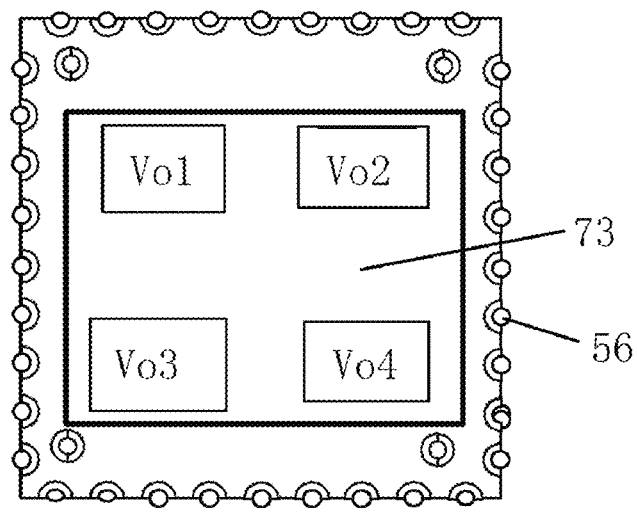
FIG. 30 is a schematic structural bottom view showing a power module according to a seventeenth exemplary embodiment.

In an embodiment. FIGS. 29 and 30 illustrate a four-phase inverse-coupled power module. The power module may adopt a chip 2' which includes four-phase half-bridge modules 2, and the midpoint of the bridge arm in each half-bridge module 2 is electrically connected to a corresponding winding 10 of the inverse-coupled inductor 1. FIG. 29 shows that a half-bridge module 2 has a circuit area 3 and a control area 4, that is, the control circuits of the half-bridge circuits are arranged in a corresponding distributed manner to improve the response and the consistency of the switching characteristics of each half-bridge circuit, which is beneficial to improving the power, efficiency and dynamic performance of the power module. In addition, the control areas 4 can be disposed on the outer side of the chip 2' relative to the half-bridge circuits, so that the signal traces can be more conveniently connected to a corresponding control circuit of the chip 2'. Such structure is convenient for design and is beneficial to reducing the degree of signal loop interference by inverse-coupled inductor. FIG. 30 also shows that the second ends of the windings 10 form four positive output pins 72 (Vo1-Vo4) on the lower surface of the power module. And a large pad 73 can be formed by the four positive output pins 72 connected together, which is convenient for application and reduces conduction loss. Similarly, the vertical conductive traces 56 are disposed around the power module. For example, arranging the Vin conductive trace and the GND conductive trace alternatively can further reduce the parasitic inductance of the input circuit and help improve the high frequency performance of the power module. Moreover, this structure is simple and compact, with high power density.

Figure 31:
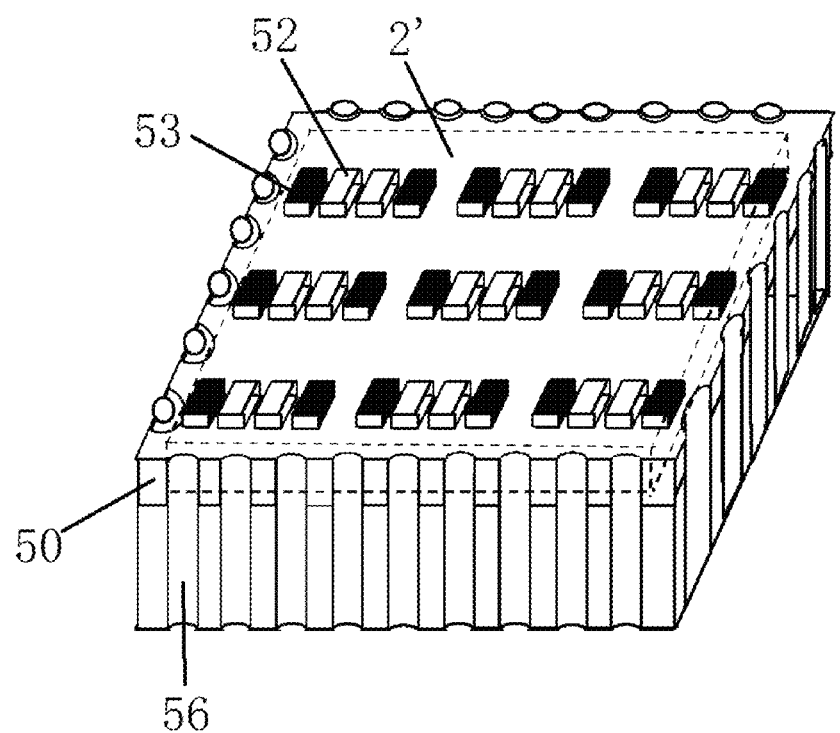
FIG. 31 is a schematic structural diagram showing a power module according to an eighteenth exemplary embodiment.
Figure 32:
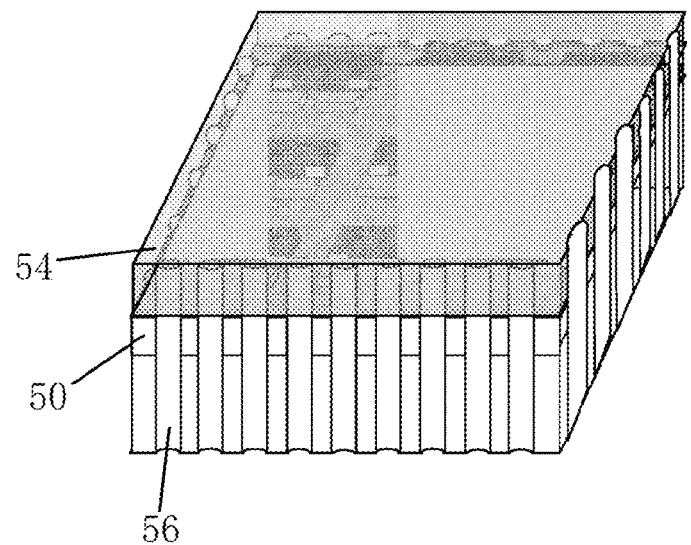
FIG. 32 is a schematic structural diagram showing a power module according to a nineteenth exemplary embodiment.

In an embodiment, FIG. 31 and FIG. 32 illustrate a schematic structural diagram of a 3×3 multi-phase inverse-coupled power module. FIG. 31 shows that the chip 2' (shown by the dashed line in the figure) can be embedded in the wiring layer structure 50, and other devices such as the capacitors 52 and the resistors 53 can be provided on the upper surface. In some other embodiments, the chip 2' can be disposed above the wiring layer structure 50, and peripheral devices (such as capacitor 52 and/or resistor 53) can be disposed around chip 2'. According to some embodiments, these peripheral devices can be disposed above the wiring layer structure 50 to be stacked with the chip 2' or be disposed around the chip 2', or disposed on the side of the wiring layer structure facing the inductor. Further, the insulating encapsulation material can also be used for packaging to form the encapsulation layer 54. Similarly, the vertical conductive traces 56 may be provided on the sides of the power module, for example, in the form of stamp holes, to realize vertical circuit connections. The conductive trace Vin and the conductive trace GND can be arranged around the power module alternately or evenly. Using such circuit structure can greatly increase the input impedance consistency of the input circuit between the multi-phase half-bridge circuits arranged in an array. For example, although the middle chip 2' among the nine chips 2' is not close to the side of the power module, and the conductive trace Vin or the conductive trace GND on the side is far away from middle chip 2', the sum of the distances from the middle chip 2' to the surroundings is roughly the same as the sum of the distances from the other 8 chips 2' to the surroundings, so that the impedance of the input circuit of individual chips 2' can be consistent. In this way, this can further improve the efficiency and dynamic performance of the multi-phase parallel connection.

The present disclosure does not impose specific limitations on the shape of the magnetic cores. In one embodiment, the first magnetic core 21 and the second magnetic core 22 are E-like magnetic core structures as shown in FIG. 2 or structures as shown in FIGS. 45 to 49.

Embodiments of the present disclosure also provide a method for manufacturing a power module, including:
providing a plurality of half-bridge modules 2;
providing a plurality of windings 10, Wherein the plurality of windings 10 are linear windings between a first plane and a second plane and perpendicular to the first plane or the second plane, each of the plurality of windings 10 includes one turn, and the first plane is parallel to the second plane;
providing a magnetic core 20 which includes a first magnetic core 21, a second magnetic core 22 and a plurality of magnetic core pillars 23, wherein the first magnetic core 21 and the second magnetic core 22 are located at both ends of each of the windings 10, respectively, the magnetic core pillars 23 connect the first magnetic core 21 and the second magnetic core 22 to form a plurality of magnetic core units, the magnetic core units are arranged corresponding to the windings 10, the plurality of magnetic core units surround corresponding windings 10 in a same direction from the first plane to the second plane, projections of the plurality of magnetic core units on the first plane form a plurality of closed areas 24, and the closed areas 24 are arranged in a one-to-one correspondence with the windings 10. The half-bridge modules 2 are connected to the windings 10 in a one-to-one correspondence, and a midpoint of a bridge arm of each of the half-bridge modules 2 is electrically coupled to a first end of a corresponding winding 10.

In an embodiment of the present disclosure, the plurality of windings 10 and the magnetic cores 20 form a inverse-coupled inductor 1, and the manufacturing method further includes: configuring a plurality of inverse-coupled inductors 1 into an inductor panel; forming a wiring layer structure 50 on the inductor panel; disposing the half-bridge modules 2 on the wiring layer structure 20; and using insulating encapsulation materials 81 for encapsulation.

Figure 33:
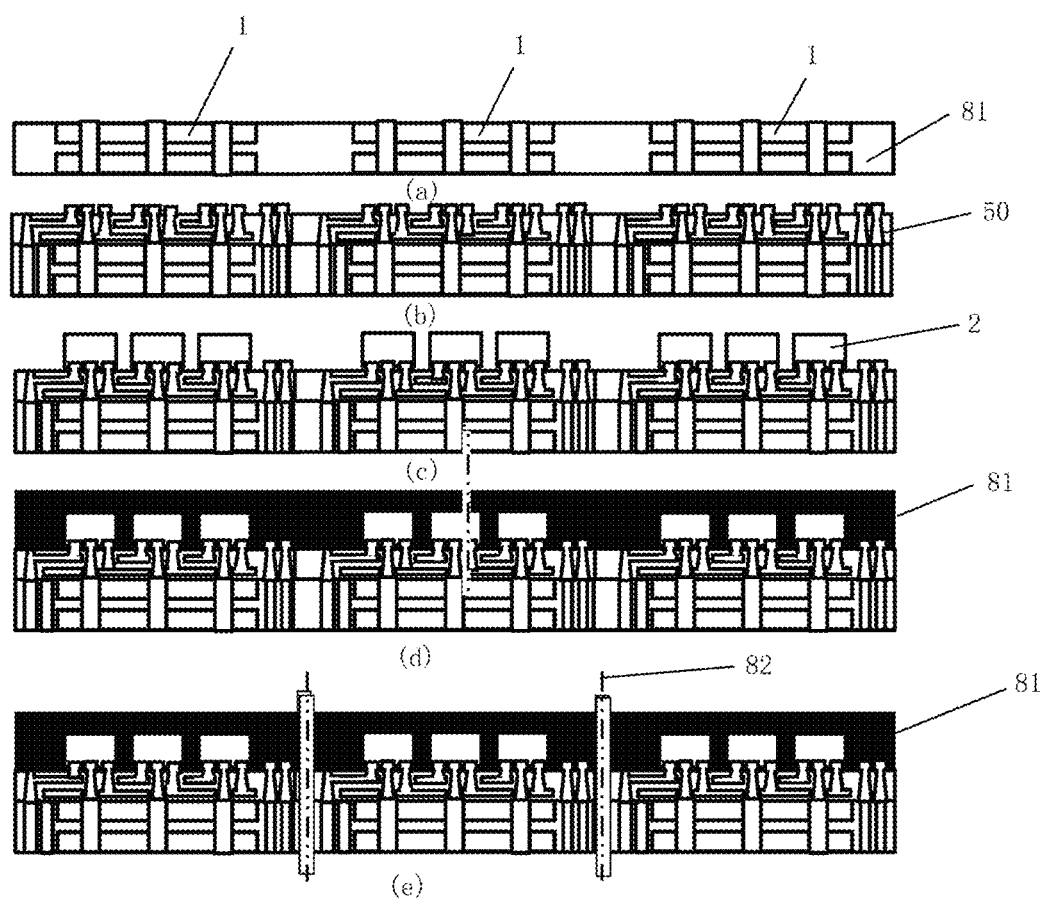
FIG. 33 is a schematic flowchart of a method for manufacturing a power module according to an exemplary embodiment.

In one embodiment, FIG. 33 illustrates the manufacturing process of a power module. In step 1, as shown in FIG.

33(a), the plurality of inverse-coupled inductors 1 can be made to form an inductor panel. In step 2, as shown in FIG. 33 (b), the wiring layer structure 50 is formed on the inductor panel. In some embodiments, conductive through holes can be provided in the insulating encapsulation material 81 to form vertical conductive traces. In step 3, as shown in FIG. 33(c), the chip (or the half-bridge modules) is soldered on the wiring layer structure 50. In step 4, as shown in FIG. 33 (d) (this is an optional step), the chip can be packaged with the insulating encapsulation material 81. In step 5, as shown in FIG. 33(e), the panel is cut at the positions as indicated by the cutting lines 82 to form the power modules shown in the foregoing embodiments. By the manufacturing processes, power modules can be mass-produced by forming inductor panels, the costs are low, the manufacturing processes are simple and the yield is high.

Figure 34:
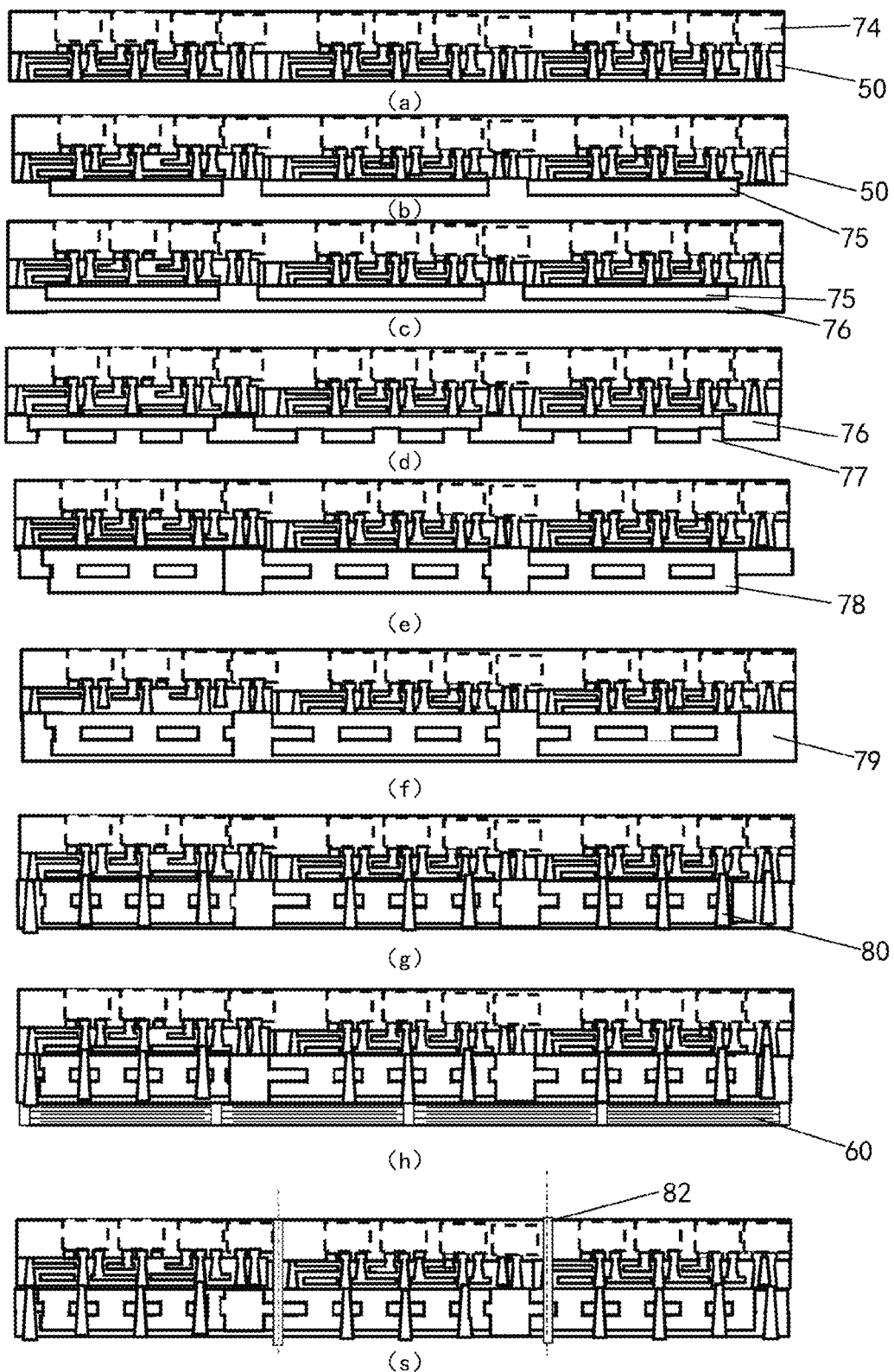
FIG. 34 is a schematic flowchart of a method for manufacturing a power module according to an exemplary embodiment.
Figure 35:
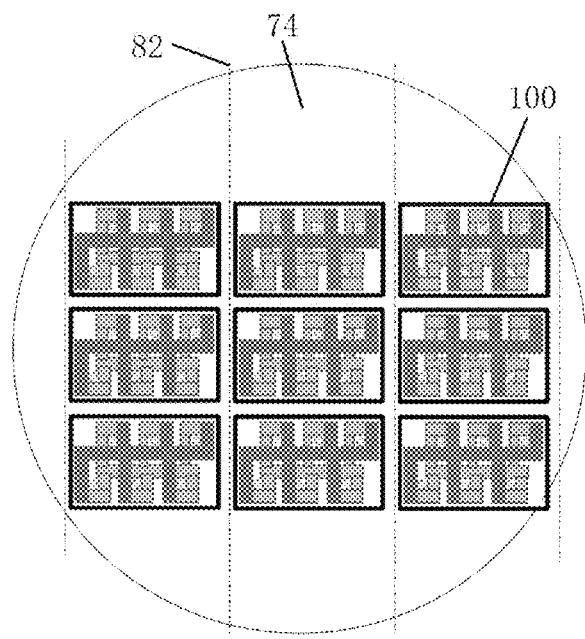
FIG. 35 is a schematic structural diagram of a power module obtained according to a method for manufacturing a power module according to an exemplary embodiment.

In one embodiment, FIG. 34 illustrates another manufacturing process of a power module. In step 1, as shown in FIG. 34(a), a wiring layer structure 50 is formed on a wafer 74. In step 2, as shown in FIG. 34(h), a first magnetic material layer 75 is formed on the wiring layer structure 50. In step 3, as shown in FIG. 34(c), a first isolation layer 76 is formed on the first magnetic material layer 75. In step 4, as shown in FIG. 34(d), a plurality of through hole 77 are provided in the first isolation layer 76 to expose a portion of the first magnetic material layer 75. In step 5, as shown in FIG. 34(e), the second magnetic material layer 78 is disposed on the first isolation layer 76, and the through holes 77 between the first magnetic material layer 75 and the second magnetic material layer 78 are filled with magnetic material, and the first magnetic material layer 75 and the second magnetic material layer 78 are connected through a magnetic path. In step 6 (this step is an optional step), as shown in FIG. 34 (f), it is also possible to dispose a second isolation layer 79 on the second magnetic material layer 78. In step 7, as shown in FIG. 34(g), a plurality of conductive vias 80 are provided which penetrate the first magnetic material layer 75 and the second magnetic material layer 78, and the upper end of the conductive vias 80 are electrically connected to the conductive traces of the wiring layer structure 50, and some of conductive vias 80 can be used as windings of the inverse-coupled inductor, and the other conductive vias 80 can be used as an input circuit or a signal conductive traces. In addition, in step 7 (this step is an optional step), a capacitor layer structure 60 can be further integrated, as shown in FIG. 34(h). In step 8, the power module 100 can be formed after being cut along the cutting lines 82 shown in FIG. 34(s) and FIG. 35. The first magnetic material layer 75 or the second magnetic material layer 78 can be prefabricated magnetic core plates or films, or formed by printing on the wiring layer structure 50 or sputtering or other methods. Wafer-based manufacture can simplify subsequent manufacturing processes, reduce costs, and improve yield. This manufacture method can also achieve power modules with smaller inductance, or a larger number of or more dense distributed inductors, which is more suitable for UHF (Ultra High Frequency) power module applications.

Embodiments of the present disclosure also provide a multi-phase inverse-coupled inductor, as shown in FIGS. 36 to 44. The multi-phase inverse-coupled inductor includes two windings 10, each winding 10 extending in a vertical direction and a magnetic core 20 including two magnetic core units which have a one-to-one correspondence with the two windings 10. Each magnetic core unit surrounds a corresponding winding 10 in a same direction from a first end to a second end, as shown by a double dotted line with arrow in FIG. 37. In the inverse coupled inductor, or called negative coupled inductor, the mutual fluxes from all windings cancel each other when all phases share the current equally. That is, a magnetic flux direction of a DC magnetic flux generated by a current flowing through any one of the windings, on the magnetic core corresponding to other one of the windings, is opposite to a magnetic flux direction of a DC magnetic flux generated by a current flowing through the other one of the windings, on the magnetic core corresponding to the other one of the windings.

Figure 36:
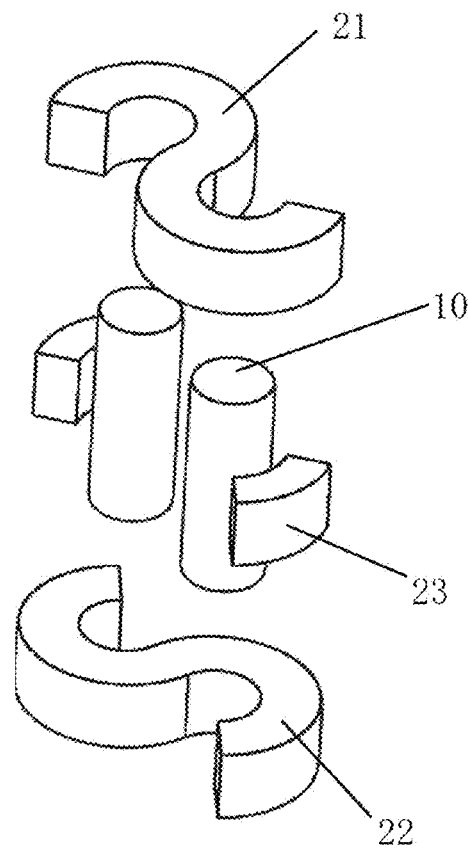
FIG. 36 is a schematic diagram showing an exploded structure of a multi-phase inverse-coupled inductor according to an exemplary embodiment.
Figure 37:
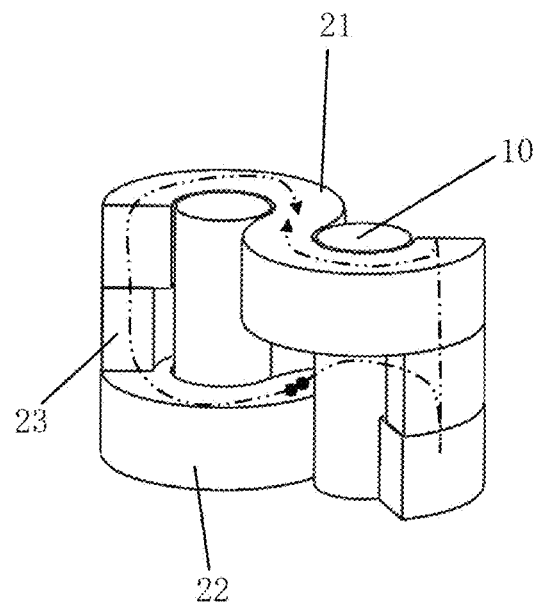
FIG. 37 is an exploded schematic structural diagram showing a multi-phase inverse-coupled inductor according to an exemplary embodiment.

In FIGS. 36 and 37, the two-phase inverse-coupled inductor includes a first magnetic core 21 and a second magnetic core 22 in an "S" shape, two magnetic core pillars 23 and windings 10. The cross-sectional shape of the windings 10 is circular. The axis of each of the windings 10 is perpendicular to the upper surface of the first magnetic core 21 or the lower surface of the second magnetic core 22. Two ends of the first magnetic core 21 and the second magnetic core 22 are connected by two magnetic core pillars 23. One end of first magnetic core pillars 23 is connected to a first end of the first magnetic core 21, and the other end is connected to a first end of the second magnetic core 22, One end of second magnetic core pillar 23 is connected to a second end of the first magnetic core 21, and the other end is connected to a second end of the second magnetic core 22. The two windings 10 are surrounded by the first magnetic core 21 and the second magnetic core 22 and two magnetic core pillars 23. Air gap can be provided at the connection of the magnetic core pillars 23 and the first magnetic core 21 or the second magnetic core 22 to adjust the inductance. It is also possible to adjust the coupling of two-phase inverse-coupled inductor by adjusting the spacing distance between the first magnetic core 21 and the second magnetic core 22. The structure of each of the components of the magnetic core of this inductor is simple, all components are planar structures and have good symmetry. In this way, the structure has small deformation of the magnetic core during the core forming and sintering process, and is beneficial to improving the manufacturing accuracy and yield of the inductor. In addition, the shape and size of the first magnetic core 21 and the second magnetic core 22 can be exactly the same, and only one mold is needed to manufacture the first magnetic core 21 and the second magnetic core 22, thereby reducing the costs.

Figure 38:
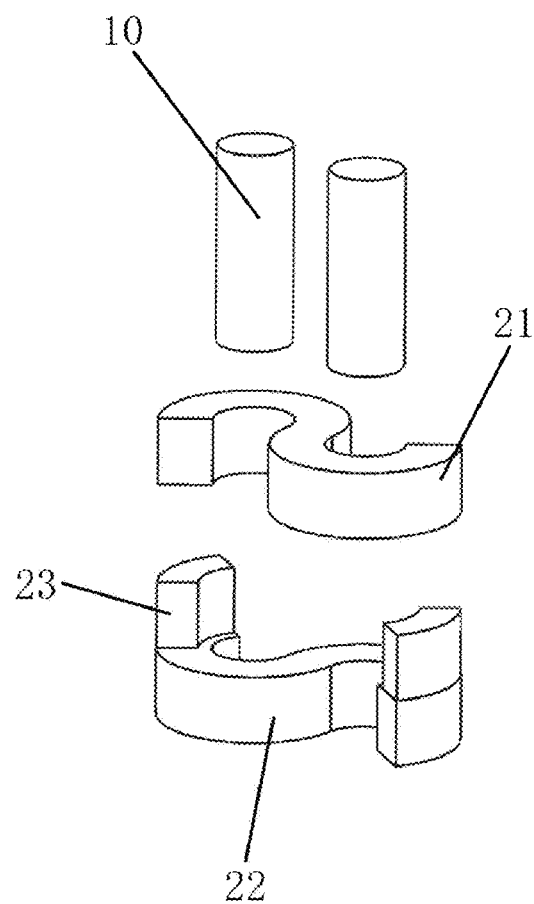
FIG. 38 is an exploded schematic structural diagram showing a multi-phase inverse-coupled inductor according to an exemplary embodiment.

FIG. 38 shows that the magnetic core pillars 23 and the second magnetic core 22 can also be integrated to form a magnetic core part, which can reduce the number of magnetic core parts and simplify the assembly process.

Figure 39:
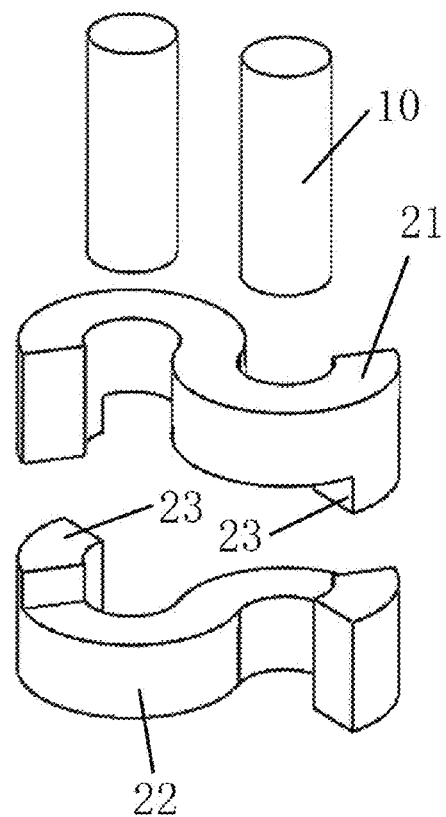
FIG. 39 is an exploded schematic structural diagram showing a multi-phase inverse-coupled inductor according to an exemplary embodiment.

FIG. 39 shows that the magnetic core pillars 23 in FIG. 37 can be divided into two halves to be integrated on both ends of the first magnetic core 21 and the second magnetic core 22 respectively. Such arrangement makes the first magnetic core 21 and the second magnetic core 22 identical. Only one mold is needed to manufacture the first magnetic core 21 and the second magnetic core 22. For the magnetic cores of the entire inductor, only one mold is needed, thereby further reducing the cost.

Figure 40:
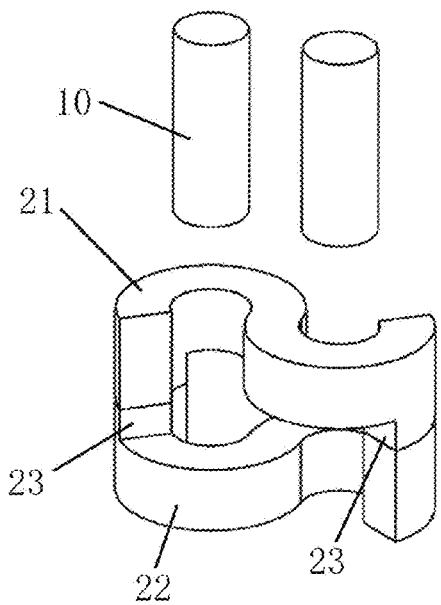
FIG. 40 is an exploded schematic structural diagram showing a multi-phase inverse-coupled inductor according to an exemplary embodiment.
Figure 41:
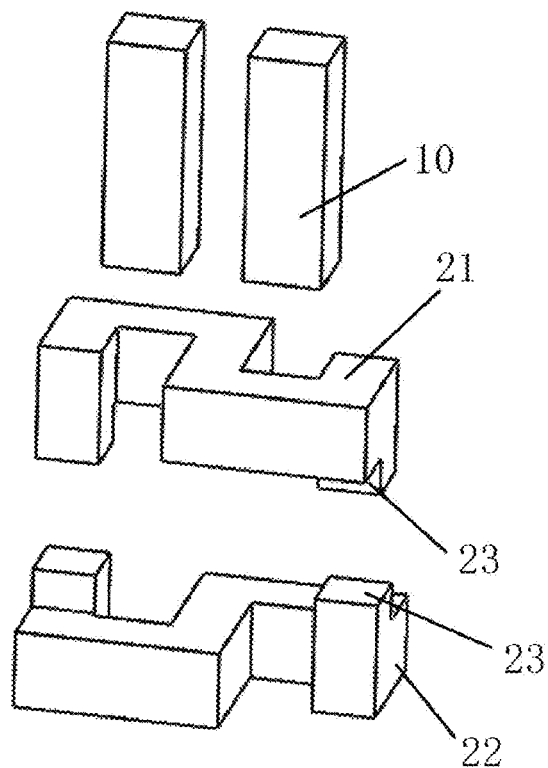
FIG. 41 is a schematic diagram showing an exploded structure of a multi-phase inverse-coupled inductor according to an exemplary embodiment.
Figure 42:
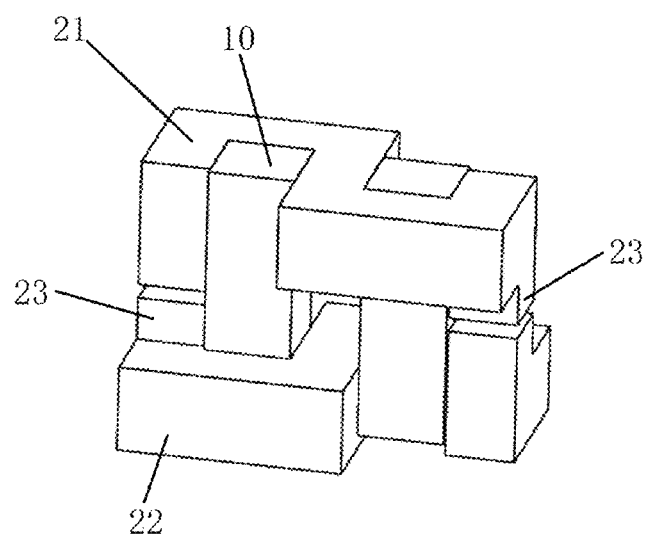
FIG. 42 is an exploded schematic structural diagram showing a multi-phase inverse-coupled inductor according to an exemplary embodiment.
Figure 43:
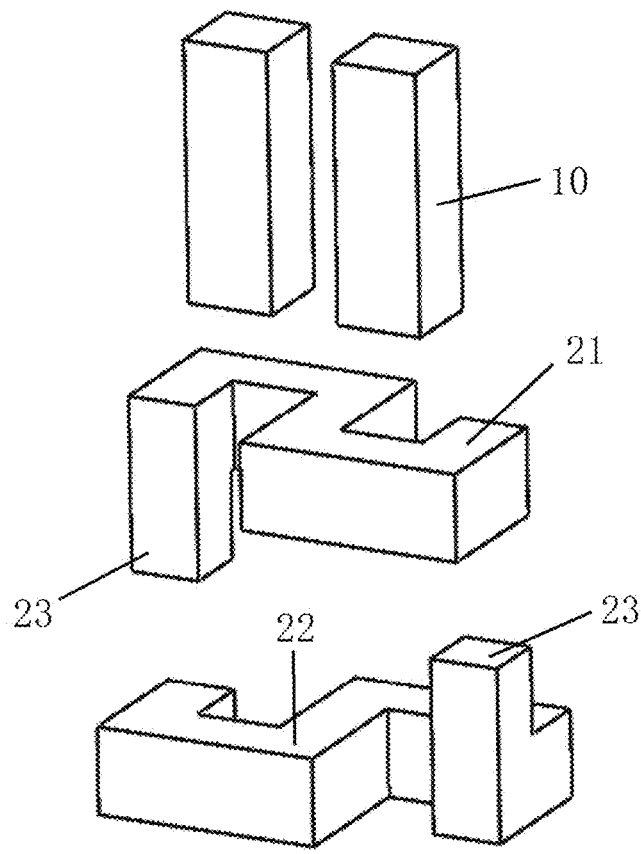
FIG. 43 is an exploded schematic structural diagram showing a multi-phase inverse-coupled inductor according to an exemplary embodiment.
Figure 44:
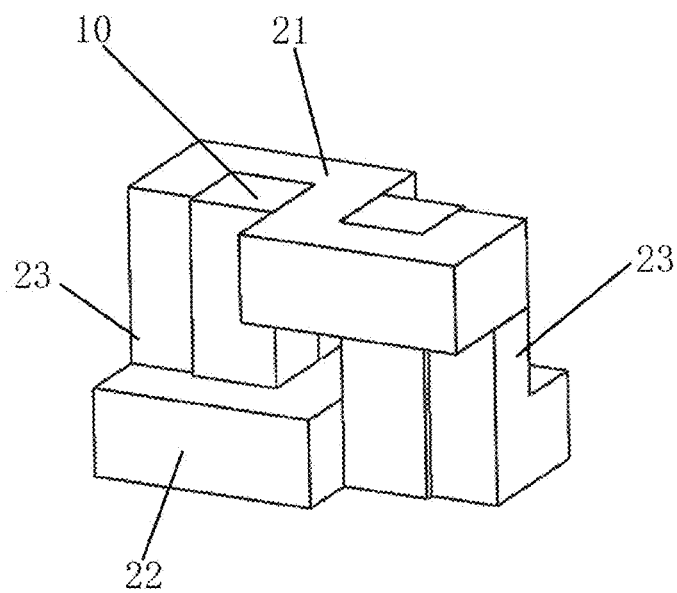
FIG. 44 is a schematic structural diagram showing a multi-phase inverse-coupled inductor according to an exemplary embodiment.

FIG. 40 shows that the magnetic core structure shown in the figure can be made in advance, After the first magnetic core 21 and the second magnetic core 22 are pre-assembled, the windings 10 can be installed, that is, the windings 10 can be inserted into the magnetic core 20 to form the two-phase inverse-coupled inductor. This method is more suitable for the production of powder core inductor materials or ferrite materials.

FIGS. 41 to 44 show that the first magnetic core 21 and the second magnetic core 22 with the "S" shape can be bent at a right angle. In this case, the cross-section of the windings 10 can also be rectangular to closely fit the magnetic core. This structure can make the shape of the inductor more square. In addition, the air gap can be disposed between the first magnetic core 21 and the second magnetic core 22 to adjust characteristics such as inductance or saturation current. According to some other embodiments, the coupling coefficient of the two-phase inverse-coupled inductor can also be adjusted by adjusting the spacing distance between the first magnetic core 21 and the second magnetic core 22.

In one embodiment, the inverse-coupled inductor can be used in the aforementioned power module.

Embodiments of the present disclosure also provide a multi-phase inverse-coupled inductor, as shown in FIGS. 45 to 49 which illustrate a structure of a three-phase inverse-coupled inductor. The inductor includes a first magnetic core 21, a second magnetic core 22, three magnetic core pillars 23 and three windings 10. The axis of each winding 10 is perpendicular to the upper surface of the first magnetic core 21 or the lower surface of the second magnetic core 22. The first magnetic core 21 and the second magnetic core 22 are exactly the same parts, and both are similar to "E"-shaped magnetic cores. One end of each magnetic core pillar 23 is connected to the horizontal column end surface of the corresponding first magnetic core 21, and the other end of each magnetic core pillar 23 is connected to the horizontal column end surface of the corresponding second magnetic core 22. The three windings 10 are arranged in a straight line and are surrounded by the first magnetic core 21, the second magnetic core 22 and the magnetic core pillars 23.

Figure 45:
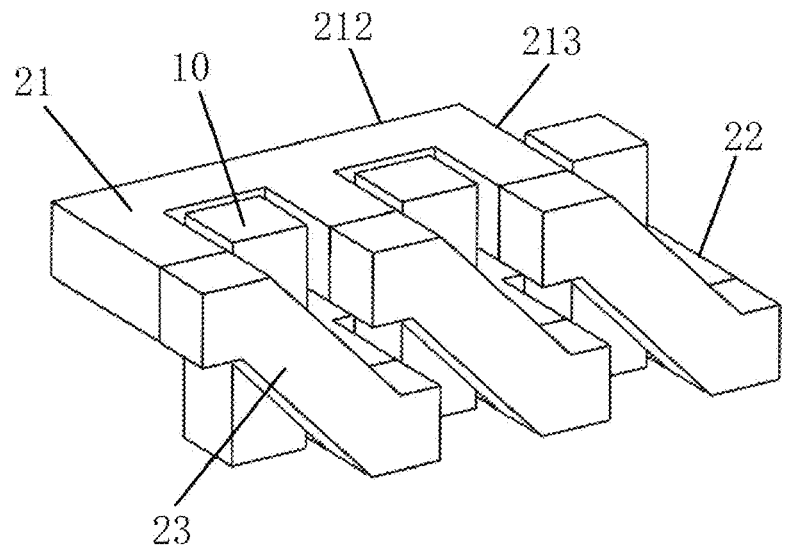
FIG. 45 is a schematic structural diagram showing a multi-phase inverse-coupled inductor according to an exemplary embodiment.
Figure 46:
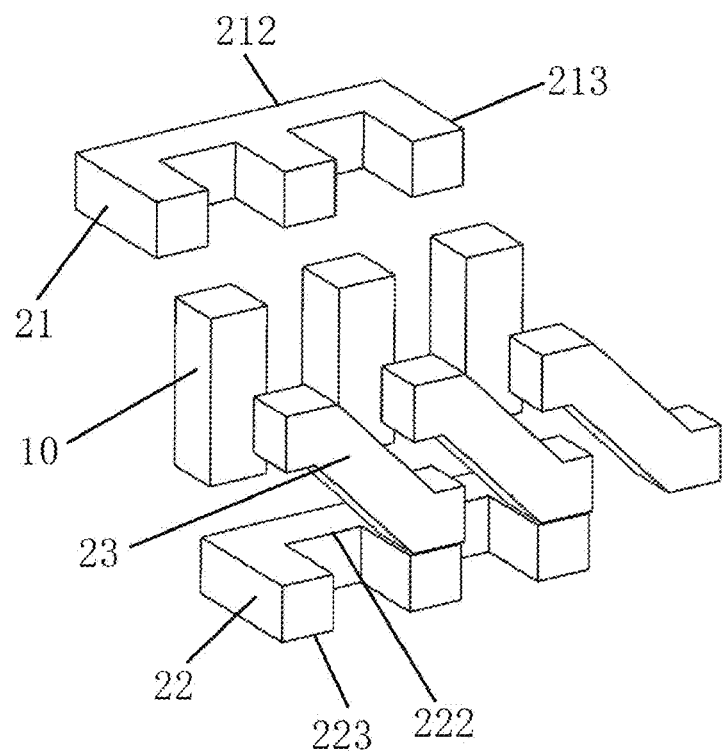
FIG. 46 is an exploded schematic structural diagram showing a multi-phase inverse-coupled inductor according to an exemplary embodiment.

As shown in FIGS. 45 and 46, the first magnetic core 21 includes a first common magnetic leg 212, and a plurality of first transverse magnetic legs 213 vertically extend out from the first common magnetic leg 212. The second magnetic core 22 includes a second common magnetic leg 222, and a plurality of second transverse magnetic legs 223 vertically extend out from the second common magnetic leg 222. The magnetic core pillars 23 are arranged corresponding to the first transverse magnetic leg 213 and the second transverse magnetic leg 223, and are connected to the first transverse magnetic leg 213 and the second transverse magnetic leg 223 to form a magnetic path.

Figure 47:
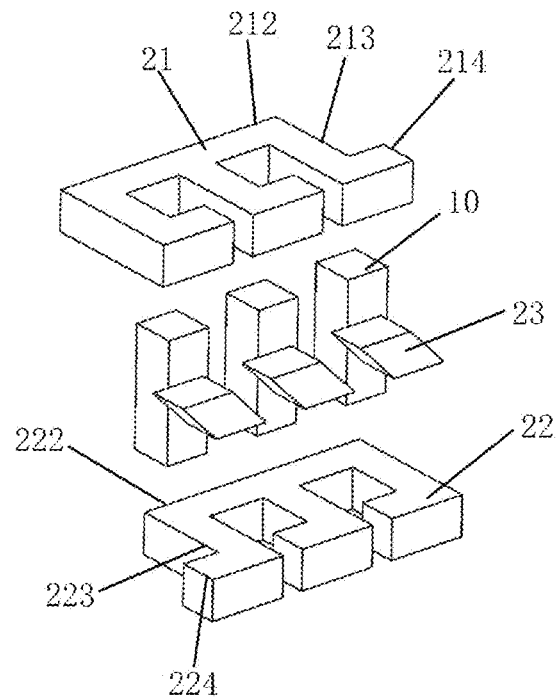
FIG. 47 is an exploded schematic structural diagram showing a multi-phase inverse-coupled inductor according to an exemplary embodiment.
Figure 48:
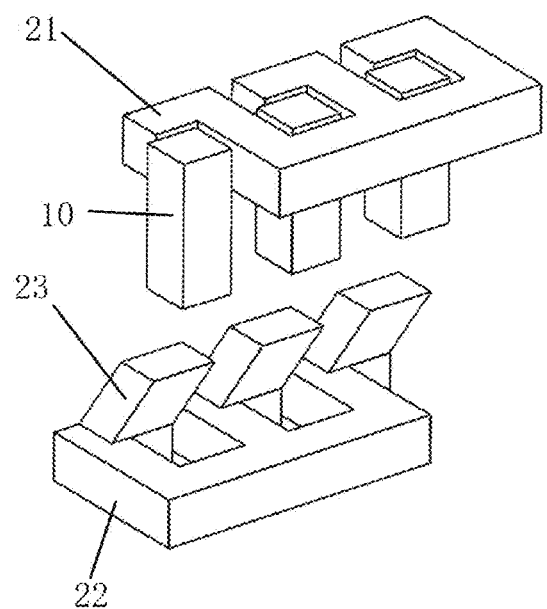
FIG. 48 is an exploded schematic structural diagram showing a multi-phase inverse-coupled inductor according to an exemplary embodiment.
Figure 49:
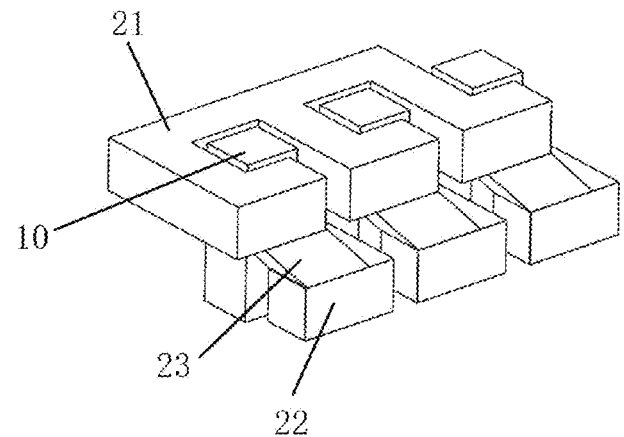
FIG. 49 is a schematic structural diagram showing a multi-phase inverse-coupled inductor according to an exemplary embodiment.

As shown in FIGS. 47 to 49, the first magnetic core 21 includes a first common magnetic leg 212, a plurality of first transverse magnetic legs 213 vertically extend out from the first common magnetic leg 212 and a plurality of third transverse magnetic legs 214 vertically extend out from the plurality of first transverse magnetic legs 213. The second magnetic core 22 includes a second common magnetic leg 222, a plurality of second transverse magnetic legs 223 vertically extend out from the second common magnetic leg 222, and a plurality of fourth transverse magnetic legs 224 vertically extend out from the plurality of second transverse magnetic legs 223. The magnetic core pillars 23 are arranged corresponding to the third transverse magnetic legs 214 and the fourth transverse magnetic legs 224, and are connected to the third transverse magnetic legs 214 and the fourth transverse magnetic legs 224 respectively to form a magnetic path.

In one embodiment, the inverse-coupled inductor can be used in the aforementioned power module.

Figure 50:
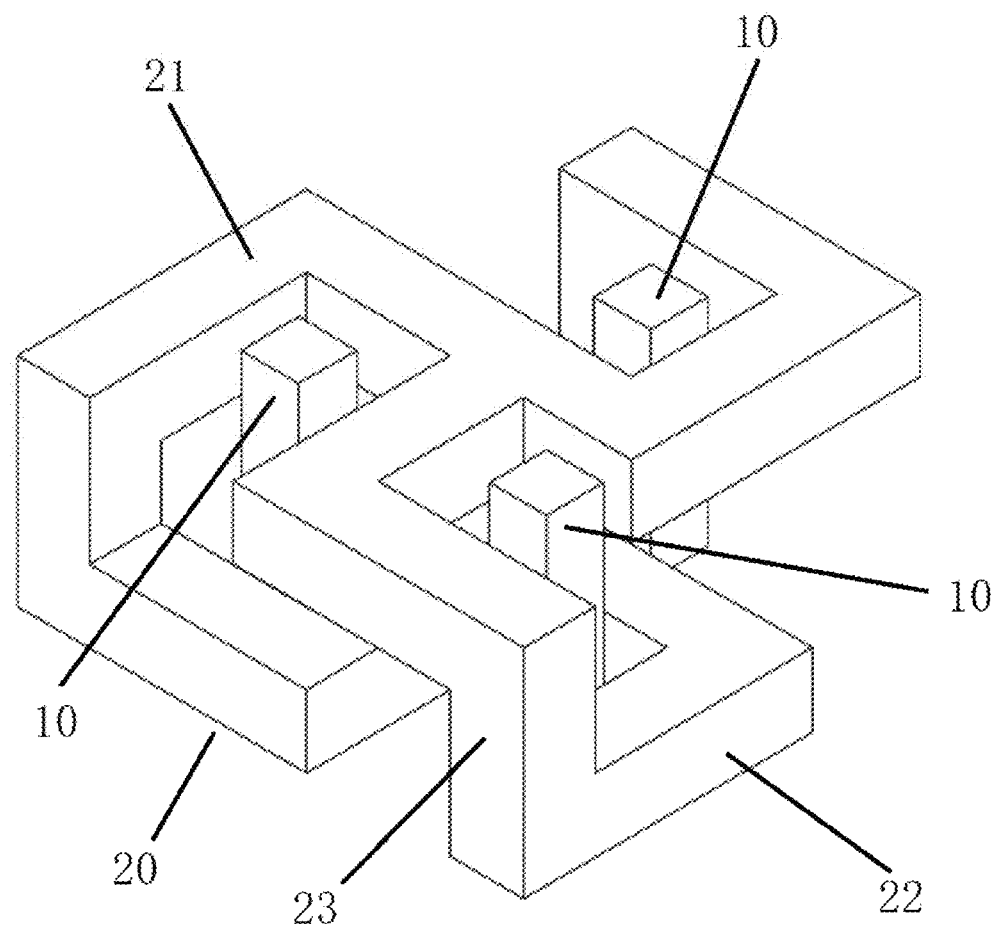
FIG. 50 is a schematic structural diagram showing a multi-phase inverse-coupled inductor viewed from a second perspective according to an exemplary embodiment.
Figure 51:
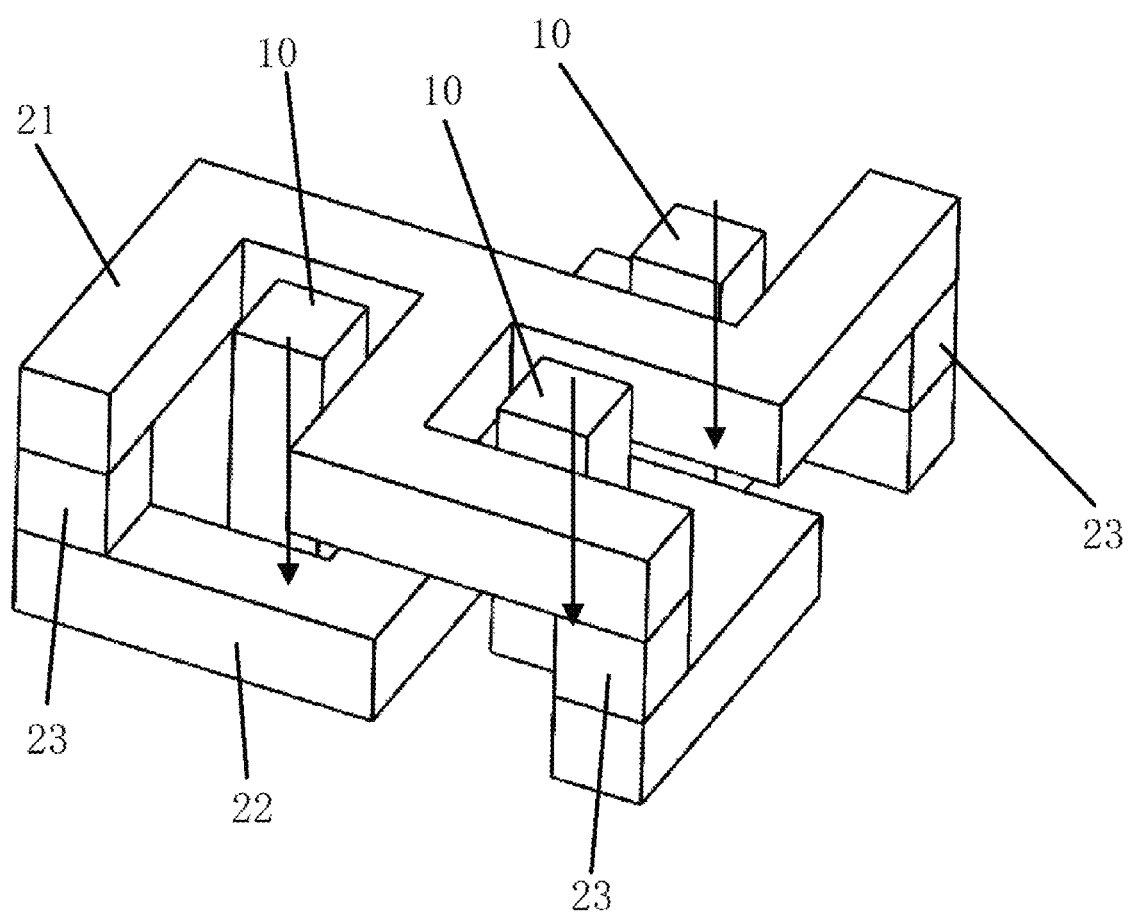
FIG. 51 is a schematic structural diagram showing a multi-phase inverse-coupled inductor according to an exemplary embodiment.

Embodiments of the present disclosure also provide a multi-phase inverse-coupled inductor. As shown in FIG. 50 and FIG. 51, the multi-phase inverse-coupled inductor includes windings 10 and a magnetic core 20. There are at least three windings 10, at least three windings 10 are linear windings between a first plane and a second plane, and are arranged in an array. The first plane and the second plane are parallel. The magnetic core 20 includes a first magnetic core 21, a second magnetic core 22, and magnetic core pillars 23, and the first magnetic core 21 and the second magnetic core 22 are located at both ends of the windings 10, respectively, the magnetic core pillars 23 connect the first magnetic core 21 and the second magnetic core 22. The first magnetic core 21, the second magnetic core 22 and the at least three magnetic core pillars 23 form at least three magnetic core units. The magnetic core units are arranged in a one-to-one correspondence with the windings 10, and the at least three magnetic core units surround corresponding windings 10 in a same direction from the first plane to the second plane. Projections of the at least three magnetic core units on the first plane form at least three closed areas 24, and the closed areas 24 are arranged in a one-to-one correspondence with the windings 10.

Figure 52:
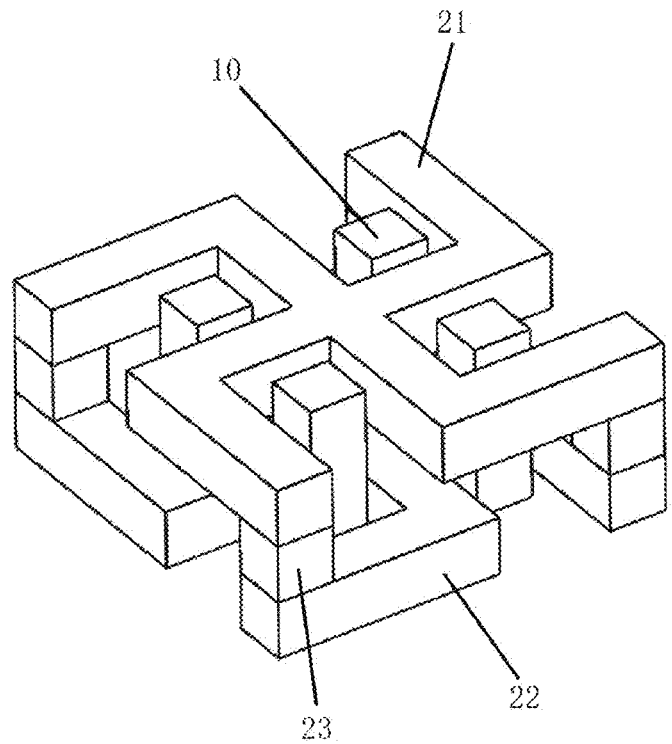
FIG. 52 is a schematic structural diagram showing a multi-phase inverse-coupled inductor viewed from a second perspective according to an exemplary embodiment.

The multi-phase coupled inductor of the present disclosure may be a three-phase coupled inductor or a n-phase coupled inductor, n being greater than 3. As shown in FIG. 52, the multi-phase coupled inductor is a four-phase coupled inductor. The windings 10 in the multi-phase coupled inductor are arranged in an array, that is, the windings 10 are arranged in multiple rows and columns, instead of all being arranged along a straight line. Such arrangement can shorten the magnetic path between the inductors and make the coupling between inductors and inductance of inductors more balanced and consistent. The windings 10 are all linear windings with one turn and vertically disposed, so that the path of the windings 10 is relatively short, and is therefore suitable for stacked power modules. Further, the windings 10 in embodiments of the present disclosure are beneficial to improving the efficiency of the power module and heat dissipation in the vertical direction. The structures of the windings 10 and the magnetic core 20 are simple and compact, and have a smaller footprint.

Figure 53:
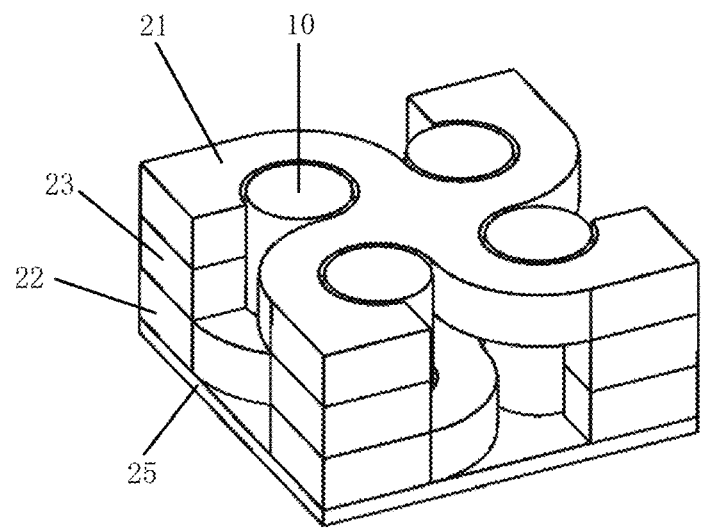
FIG. 53 is a schematic structural diagram showing a multi-phase inverse-coupled inductor according to an exemplary embodiment.

As shown in FIG. 53, in some embodiments, the multi-phase coupled inductor may further include a conductive plate 25, and the windings 10 are all connected to the conductive plate 25. Specifically, the second ends of four windings 10 are all connected to the conductive plate 25. The conductive plate 25 can be used as the common output terminal of the entire multi-phase coupled inductor to facilitate the electrical connection of the multi-phase coupled inductor with other electronic devices, and such arrangement can make various practical applications more convenient.

Figure 54:
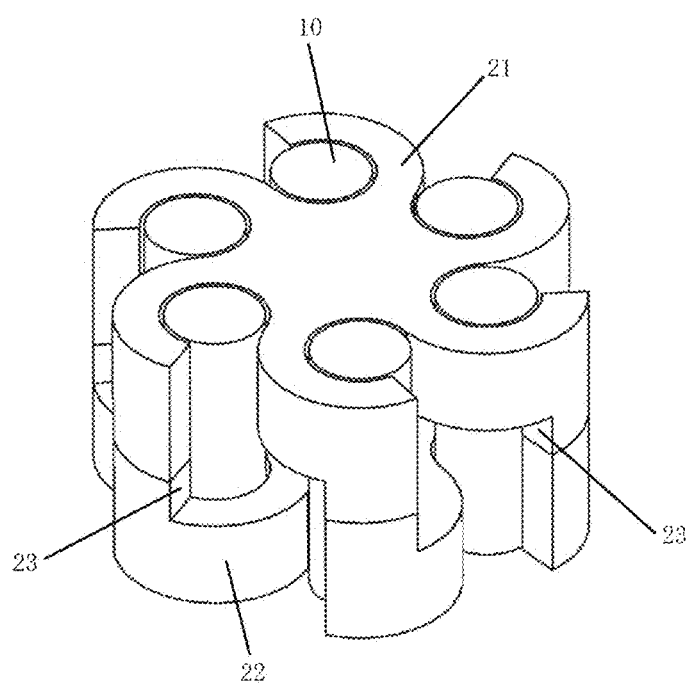
FIG. 54 is a schematic structural diagram showing a multi-phase inverse-coupled inductor according to an exemplary embodiment.

In one embodiment, as shown in FIG. 54, the multi-phase coupled inductor is a six-phase coupled inductor, and the magnetic core 20 includes a first magnetic core 21, a second magnetic core 22, six pairs of magnetic core pillars 23, and six windings 10 arranged in a circular array. The first magnetic core 21 and the second magnetic core 22 each include a connection portion located in the middle and six branches extending outward from the connection portion. The six branches of the first magnetic core 21 and the six branches of the second magnetic core 22 are connected together by the magnetic core pillars 23 in a one-to-one correspondence. In some embodiments, as shown in FIG. 54, the ends of the six branches of the first magnetic core 21 and the second magnetic core 22 are provided with protrusion structures as the magnetic core pillars 23. The upper part formed by integrating the first magnetic core 21 with the six magnetic core pillars 23 at the ends thereof has the same shape as the lower part formed by integrating the second magnetic core 22 with the six magnetic core pillars 23 at the ends thereof.

Figure 55:
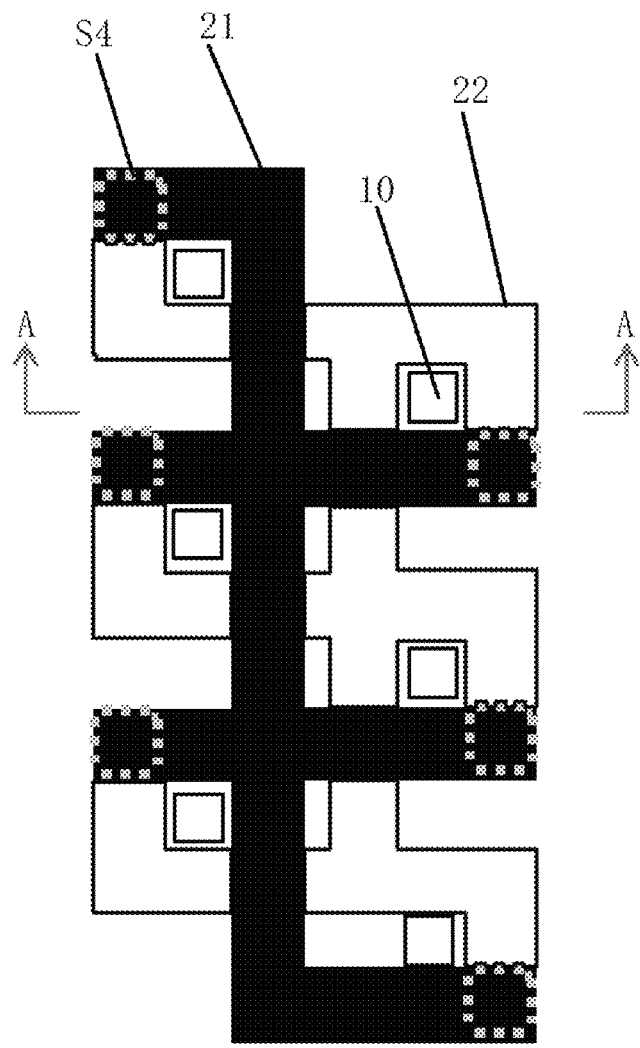
FIG. 55 is a schematic structural diagram showing a multi-phase inverse-coupled inductor according to an exemplary embodiment.
Figure 56:
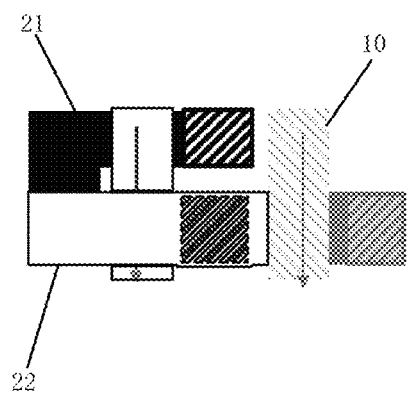
FIG. 56 is a schematic cross-sectional structure diagram taken along A-A in FIG. 55.

In one embodiment, as shown in FIGS. 55 and 56, the first magnetic core 21 includes a first connection portion with linear columnar shape and six branches extending outward from the first connection portion, three of which extend to the left of the first connection portion, and the other three branches extend to the right side of the first connection portion. The second magnetic core 22 includes a second connection portion with linear columnar shape and six branches extending outward from the second connection portion, three of which extend to the left of the second connection portion, and the other three branches extend to the right side of the second connection portion. The six branches of the first magnetic core 21 and the six branches of the second magnetic core 22 are connected by the magnetic core pillars 23 in a one-to-one correspondence. The first magnetic core 21, the second magnetic core 22 and the magnetic core pillars form six magnetic core units, and the six magnetic core units surround the six windings 10 in a one-to-one correspondence. This connection method makes the length for connecting the magnetic pillars relatively short, which is more conducive to reducing the magnetic core loss. The direction of current flowing through each winding 10 can be from top to bottom, and there exists reverse-coupling between the windings 10. In FIG. 55, the first connection portion and the second connection portion are drawn staggered for display convenience. Actually, the first connection portion and the second connection portion overlap one another up and down as shown in FIG. 56, and the structure is compact. In one embodiment, the multi-phase coupled inductor can be applied to the above-mentioned power module.

Figure 57:
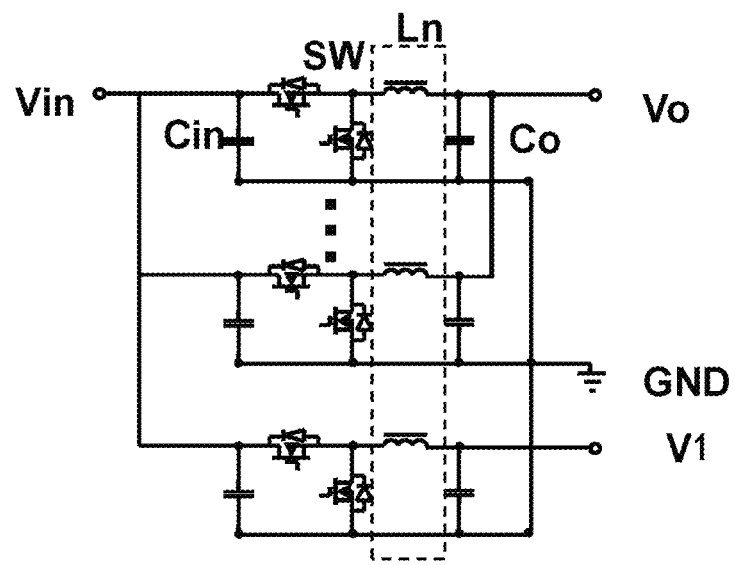
FIG. 57 is a schematic circuit diagram of a multi-phase Buck circuit.
Figure 58:
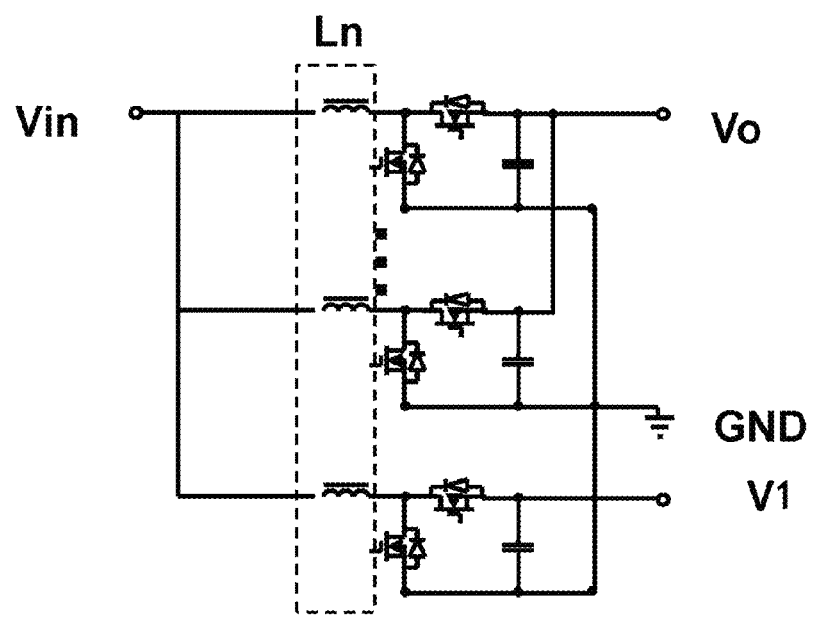
FIG. 58 is a schematic circuit diagram of a multi-phase Boost circuit.
Figure 59:
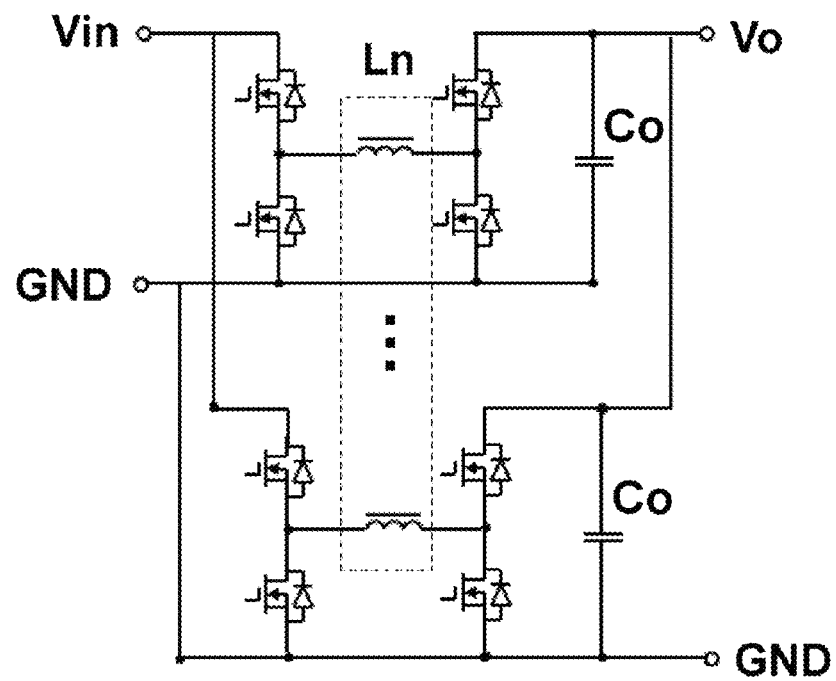
FIG. 59 is a schematic circuit diagram of a multi-phase parallel tour-switch Buck/Boost circuit.
Figure 60:
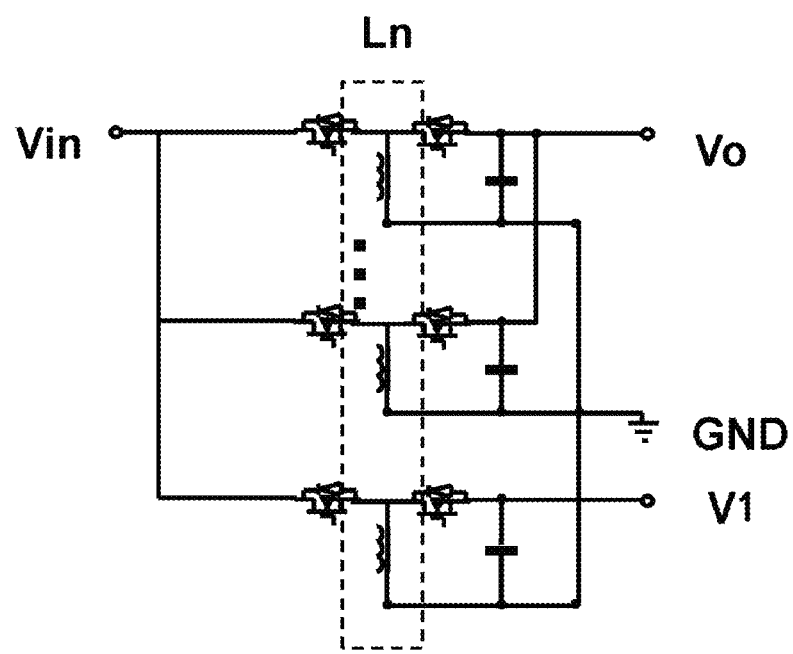
FIG. 60 is a schematic circuit diagram of a multi-phase parallel Buck/Boost circuit.

FIGS. 57 to 60 show the application of multi-phase inverse-coupled inductors in some circuits, and the multi-phase coupled inductors may adopt the structures in the above-mentioned embodiments. FIG. 57 illustrates a multi-phase parallel Buck circuit(a voltage reduce convertor), FIG. 58 illustrates a multi-phase parallel Boost circuit(a voltage increase convertor), FIG. 59 illustrates a multi-phase parallel four-switch Buck-Boost circuit, and FIG. 60 shows a principle of a multi-phase parallel Buck-Boost circuit, where Ln represents the multi-phase coupled inductor, Cin represents the input capacitance, Co represents the output capacitance, Vin represents the positive input of the half-bridge circuit, GND represents the negative input of the half-bridge circuit, Vo represents the positive output of the half-bridge circuit, SW represents the midpoint of the half-bridge circuit, and V1 represents the positive output of the half-bridge circuit with a different output voltage from Vo. It should be noted that the multi-phase coupled inductor of the present disclosure is not limited to being applied to these circuits, and can also be used in other circuit topologies, such as Cuk circuits, flyback circuits, switch capacitor circuits, or LLC circuits.

Embodiments of the present disclosure also provide a power supply system, including: the above-mentioned power module; a system circuit board 110; and a load 120. The load 120 is disposed on a first surface of the system circuit board 110. The power module is disposed on the first surface of the system circuit board 110 and is around the load 120; and/or the power module is disposed on a second surface of the system circuit board 110, and the projection of the power module on the plane at least partially overlaps the projection of the load 120 on the plane.

In one embodiment, as shown in FIG. 61, the upper and lower sides of the system circuit board 110 are provided with power modules 100. One of the power modules 101) and the load 120 are arranged on the same side of the system circuit board 110. The output Vo of the power module 100 is transmitted to the electrical load 120 via the system circuit board 110, and the distance from each phase to the electrical load 120 can be consistent, which is beneficial to improving the efficiency and dynamics of multi-phase parallel power supply. The power load 120 may be a CPU or GPU, or other smart chips. Another one of the power modules 100 is disposed on a side of the system circuit board 110 different from the side on which the load 120 is arranged, and the projection of the power module 100 on the plane at least partially overlaps the projection of the load 120 on the plane, so that the power supply path is vertical and short, which is beneficial to improving the efficiency and dynamics of multi-phase parallel power supply.

When the power module of the present disclosure realizes reverse-coupling and uses vertical windings with one-turn, the chips can be disposed on the upper surface of the inverse-coupled inductor, and higher power density and higher efficiency can be achieved. Further, the power module has better consistency in reverse-coupling of each phase. In addition, because each of the windings of the inverse-coupled inductor include only one turn and is arranged vertically, the path is short, which is beneficial to the heat dissipation of the power module in the vertical direction.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:
1. A power module, comprising:
an inverse-coupled inductor; and
a plurality of half-bridge modules disposed on the inverse-coupled inductor;
wherein the inverse-coupled inductor comprises:
a plurality of windings, wherein the plurality of windings are linear windings between a first plane and a second plane and perpendicular to the first plane or the second plane, each of the plurality of windings comprises one turn, and directions of current in the plurality of windings are the same, and the first plane is parallel to the second plane;
a magnetic core comprising a first magnetic core, a second magnetic core and a plurality of magnetic core pillars, wherein the first magnetic core and the second magnetic core are located at both ends of each of the windings respectively, the plurality of magnetic core pillars connect the first magnetic core and the second magnetic core to form a plurality of magnetic core units, the plurality of magnetic core units are arranged corresponding to the plurality of windings, the plurality of magnetic core units surround corresponding windings and extend from the first plane to the second plane in a same direction, and projections of the plurality of magnetic core units on the first plane form a plurality of closed areas;
wherein the plurality of half-bridge modules are connected to the plurality of windings in a one-to-one correspondence, and a midpoint of a bridge arm in each of the plurality of half-bridge modules is electrically coupled to a first end of a corresponding one of the plurality of windings.

2. The power module according to claim 1, wherein a vertical projection of the midpoint of the bridge arm in each of the plurality of half-bridge modules on the first plane at least partially overlaps with a vertical projection of a corresponding winding on the first plane.

3. The power module according to claim 1, further comprising:
a wiring layer structure disposed between the inverse-coupled inductor and the half-bridge modules.

4. The power module according to claim 3, wherein the wiring layer structure comprises a first conductive layer and a second conductive layer, the first conductive layer is electrically connected to a positive input pin, and the second conductive layer is electrically connected to a negative input pin.

5. The power module according to claim 4, wherein a plurality of conductors are provided in the wiring layer structure; a plurality of through holes are provided in both the first conductive layer and the second conductive layer, and the plurality of conductors pass through the through holes; one end of each of the conductors is electrically connected to the midpoint of the bridge arm in a corresponding half-bridge module, and the other end of the each of the conductors is connected to the first end of the corresponding winding.

6. The power module according to claim 3, wherein the inverse-coupled inductor is a three-phase inverse-coupled inductor with three windings, and the three windings are arranged in an array which is an equilateral triangle or a right-angled triangle, and a reserved space is formed in the power module;
wherein the power module further comprises: a controller and a peripheral electronic device disposed in the reserved space; and the peripheral electronic device is located on one side of the wiring layer structure, and the controller is located on the other side of the wiring layer structure.

7. The power module according to claim 6, further comprising:
a plurality of vertical conductive traces configured to connect the power module to an external circuit; and the vertical conductive traces are disposed in the reserved space or a periphery of the inverse-coupled inductor.

8. The power module according to claim 7, wherein the vertical conductive traces comprise: a positive input trace and a negative input trace, and the positive input trace and the negative input trace are nested concentrically and are insulated from one another.

9. The power module according to claim 7, wherein the vertical conductive traces are disposed outside the magnetic core units after the magnetic core units are injection molded.

10. The power module according to claim 9, wherein the vertical conductive traces comprise: a positive input trace and a negative input trace, and the positive input trace and the negative input trace are alternately disposed.

11. The power module according to claim 10, wherein the positive input trace and the negative input trace form a positive input pin and a negative input pin through stamp hole shape pads respectively.

12. The power module according to claim 3, further comprising:
a capacitor layer structure, disposed on a side of the inverse-coupled inductor away from the half-bridge modules.

13. The power module according to claim 3, further comprising:
a conductive trace module, disposed adjacent to the inverse-coupled inductor and comprising a plurality of vertical conductive traces, wherein two adjacent vertical conductive traces are insulated from one another.

14. The power module according to claim 3, further comprising:
a copper block, disposed adjacent to the inverse-coupled inductor and welded to the wiring layer structure.

15. The power module according to claim 3, further comprising:
a special-shaped circuit board connected to the wiring layer structure;
wherein the special-shaped circuit board is provided with a groove, and the magnetic core is disposed in the groove.

16. The power module according to claim 15, wherein a plurality of vertical conductive traces are disposed in the special-shaped circuit board, and at least two vertical conductive traces pass through respective magnetic core units to form the windings.

17. The power module according to claim 1, wherein:
second ends of the windings are connected together by a pad to form one positive output pin; or
the second ends of the windings form a plurality of positive output pins by a plurality of pads.

18. The power module according to claim 1, wherein the plurality of the half-bridge modules are disposed in different chip respectively; or the plurality of half-bridge modules are integrated in one chip.

* * * * *